United States Patent
Kohno et al.

(10) Patent No.: US 8,452,239 B2
(45) Date of Patent: May 28, 2013

(54) RADIO COMMUNICATION DEVICE, PROGRAM AND RADIO COMMUNICATION METHOD

(75) Inventors: Michinari Kohno, Tokyo (JP); Kenji Yamane, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 454 days.

(21) Appl. No.: 12/740,689

(22) PCT Filed: Nov. 14, 2008

(86) PCT No.: PCT/JP2008/070788
§ 371 (c)(1),
(2), (4) Date: Apr. 29, 2010

(87) PCT Pub. No.: WO2009/063982
PCT Pub. Date: May 22, 2009

(65) Prior Publication Data
US 2010/0240320 A1    Sep. 23, 2010

(30) Foreign Application Priority Data

Nov. 15, 2007  (JP) ................................. 2007-297154
Mar. 17, 2008  (JP) ................................. 2008-068220

(51) Int. Cl.
*H04B 1/00*    (2006.01)
*H04B 7/00*    (2006.01)
*H04B 15/00*   (2006.01)

(52) U.S. Cl.
USPC .......................................... 455/72; 455/63.1

(58) Field of Classification Search
USPC .................... 455/72, 67.13, 63.1, 67.11, 570, 455/114.2, 115.1, 278.1, 283, 296
See application file for complete search history.

(56) References Cited

U.S. PATENT DOCUMENTS

| | | | |
|---|---|---|---|
| 6,087,961 | A | 7/2000 | Markow |
| 2004/0214565 | A1 | 10/2004 | Shinmei |
| 2005/0209921 | A1 | 9/2005 | Roberts et al. |
| 2005/0228613 | A1 | 10/2005 | Fullerton et al. |
| 2006/0267841 | A1 | 11/2006 | Lee et al. |
| 2007/0060170 | A1 | 3/2007 | Fukui |

FOREIGN PATENT DOCUMENTS

| | | |
|---|---|---|
| EP | 1 489 432 A1 | 6/2004 |
| EP | 1 811 426 A2 | 11/2006 |
| JP | 05-167471 | 7/1993 |
| JP | 2002-300545 | 10/2002 |

(Continued)

OTHER PUBLICATIONS

Extended English-language European Search Report in corresponding EP 08 79 2400, mailed Jul. 5, 2012.
Extended English-language European Search Report in corresponding EP 08 85 0127, mailed Jul. 17, 2012.

(Continued)

*Primary Examiner* — Eugene Yun
(74) *Attorney, Agent, or Firm* — Finnegan, Henderson, Farabow, Garrett & Dunner, L.L.P.

(57) ABSTRACT

Provided is a radio communication device for operating in an autonomous distributed manner which includes a compression unit that compresses streaming data, a control unit that controls a compression rate of streaming data of the compression unit according to a distance from other radio communication device, a transmission unit that transmits the streaming data compressed by the compression unit to the other radio communication device.

10 Claims, 16 Drawing Sheets

FOREIGN PATENT DOCUMENTS

| | | |
|---|---|---|
| JP | 2002-300548 | 10/2002 |
| JP | 2002-325211 | 11/2002 |
| JP | 2004-032394 | 1/2004 |
| JP | 2004-328542 | 11/2004 |
| JP | 2005-301428 | 10/2005 |
| JP | 2005-301804 | 10/2005 |
| JP | 2006-081036 | 3/2006 |
| JP | 2006-253765 | 9/2006 |
| JP | 2007-071816 | 3/2007 |
| JP | 2007-089090 | 4/2007 |
| JP | 2007-142944 | 6/2007 |
| JP | 2007-189726 | 7/2007 |
| KR | 20080069337 | 7/2008 |

OTHER PUBLICATIONS

Extended English-language European Search Report in corresponding EP 08 85 0303, mailed Jul. 20, 2012.

International Search Report from the Japanese Patent Office for International Application No. PCT/JP2008/070788 (Dec. 16, 2008).

European Patent Office Search Report issued on Sep. 6, 2012, in Application No. 08849521.3 (9 pages).

Office Action dated Oct. 2, 2012, in Japanese Patent Application No. 2008-068226 (6 pages).

Yamada et al., "Indoor Area Estimation based on Propagation Loss Characteristics of Wireless LAN," The Institute of Electronics, Information and Communication Engineers, Feb. 23, 2006, vol. 105, No. 627, pp. 181-184.

| DEVICE INFORMATION | EVALUATION FORMULA |
|---|---|
| Model 001 | EVALUATION FORMULA 1 |
| Model 002 | EVALUATION FORMULA 2 |
| Model 003 | EVALUATION FORMULA 3 |
| Model 004 | EVALUATION FORMULA 4 |

RADIO COMMUNICATION DEVICE, PROGRAM AND RADIO COMMUNICATION METHOD

TECHNICAL FIELD

The present invention relates to a radio communication device, a program, and a radio communication method.

BACKGROUND ART

Recently, portable radio communication devices including a radio communication function have been widely used. The radio communication device can perform radio communication with other radio communication devices by directly transmitting/receiving radio signals to/from another radio communication device, for example. Radio communication by such radio communication device sometimes is referred to as an ad-hoc mode in comparison with an infrastructure mode which requires a base station.

For example, a radio communication device can decode and transmit video data, imaged by a imaging device, as a RTP (Real time Transport Protocol) packet while a radio communication device on the receiving side can encode the RTP packet and reproduce the video data. At this point, if a data compression rate in decoding is high, a data amount per frame will be decreased. On the other hand, if the data compression rate in decoding is low, the data amount per frame will be increased.

Besides, in the same condition of a communication path, if the data amount per frame is large, the possibility of data loss occurrence is high while being transmitted wirelessly as the RTP packet, and if the data amount per frame is small, the possibility of data loss occurrence is low while being transmitted wirelessly as the RTP packet. Note that such decoding of video data is disclosed, for example, in Patent Document 1.
[Patent Citation 1] JP2007-89090(A)

DISCLOSURE OF INVENTION

Technical Problem

However, in an ad-hoc communication, communication path conditions between two of the radio communication devices is changing from moment to moment. Therefore, if video data is decoded at a fixed compression rate, there is concern that an unacceptable amount of data loss will occur in cases such as the bad condition of the communication path.

The present invention is made in view of the above-mentioned issue, and aims to provide a radio communication device, a program and a radio communication method, which are new and improved and are capable of dynamically changing a compression rate of transmission data according to communication path conditions.

Technical Solution

According to the first aspect of the present invention in order to achieve the above-mentioned object, there is provided a radio communication device which operates without relaying radio base station including, a compression unit that compresses streaming data, a control unit that controls a compression rate of the streaming data of the compression unit according to a distance from other radio communication devices, and a transmission unit that transmits the streaming data compressed by the compression unit to the other radio communication devices.

With such a configuration, the compression unit compresses the streaming data at the compression rate according to the distance from other radio communication device based on a control by the control unit. Therefore, the radio communication device can dynamically change the compression rate of the streaming data according to the distance to the other radio communication device.

The radio communication device may further include a reception unit that receives a radio signal transmitted from the other radio communication device; a measurement unit that measures a field intensity of the radio signal received by the reception unit; a determination unit that determines whether the radio signal received by the reception unit satisfies the predetermined condition regarding noise component; and an estimation unit that estimates a distance from the other radio communication device based on a field intensity of a radio signal, which is determined to satisfy the predetermined condition regarding noise component by the determination unit.

The control unit may increase the compression rate as the distance is estimated to be more distant by the estimation unit. Besides, the control unit may control the compression rate so that the streaming data is to be compressed at a rate according to the distance estimated by the estimation unit.

The determination unit may determine that the noise component of the radio signal satisfies the predetermined condition regarding noise component when the noise component is greater than a lower limit set value and lower than an upper limit set value. The reception unit may receive device information, from the other radio communication device in advance, which indicates a transmitting power of the radio signal of the other radio communication device, and the estimation unit may estimate a distance from the other radio communication device using the device information.

The estimation unit may calculate an average value of field intensities of the radio signals which are determined to satisfy the predetermined condition by the determination unit, determine whether the average value is included in any one of classified average value ranges, and estimate that the distance from the other radio communication device is a distance corresponding to the average value range to which the average value is included. Here, the field intensity of the radio signal may be calculated as the average value of transfer average values.

According to the second aspect of the present invention in order to achieve the above-mentioned object, there is provided a program for causing a computer, which is provided to a radio communication device that has a transmission unit for transmitting the streaming data to other radio communication device and that operates without relaying a radio base station, to function as a compression unit that compresses the streaming data and a control unit that controls a compression rate of the streaming data of the compression unit according to a distance from the other radio communication device.

Such a program can control a hardware resource of computer including a CPU, an ROM or an RAM to execute the function of the compression unit and the control unit above. In other words, it is possible to have a computer using the program function as the compression unit and the control unit above.

According to the third aspect of the present invention in order to achieve the above-mentioned object, there is provided a radio communication method that is implemented for a radio communication device that operates without relaying on a radio base station, including the steps of; controlling a compression rate of streaming data of the compression unit according to a distance from other radio communication device; compressing the streaming data at the compression rate; and transmitting the compressed streaming data to other radio communication device without relaying on a radio base station.

Advantageous Effects

As described above, in the radio communication device, program and radio communication method according to the present invention, the compression rate of the transmitting data can be dynamically changed according to communication path conditions.

BEST MODE FOR CARRYING OUT THE INVENTION

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, Description of Embodiments will be described in order of the following items.
[1] Outline of radio communication system according to first embodiment
[2] Radio communication device according to first embodiment
  [2-1] Hardware configuration of radio communication device according to first embodiment
  [2-2] Functions of radio communication device according to first embodiment
  [2-3] Operation of radio communication device according to first embodiment
[3] Radio communication device according to second embodiment
  [3-1] Developments to achieve second embodiment
  [3-2] Functions of radio communication device according to first embodiment
  [3-3] Operation of radio communication device according to first embodiment
[4] Conclusion

[1] Outline of Radio Communication System According to First Embodiment

Firstly, a radio communication system 1 according to a first embodiment will be schematically described with reference to FIG. 1.

Figure 1:
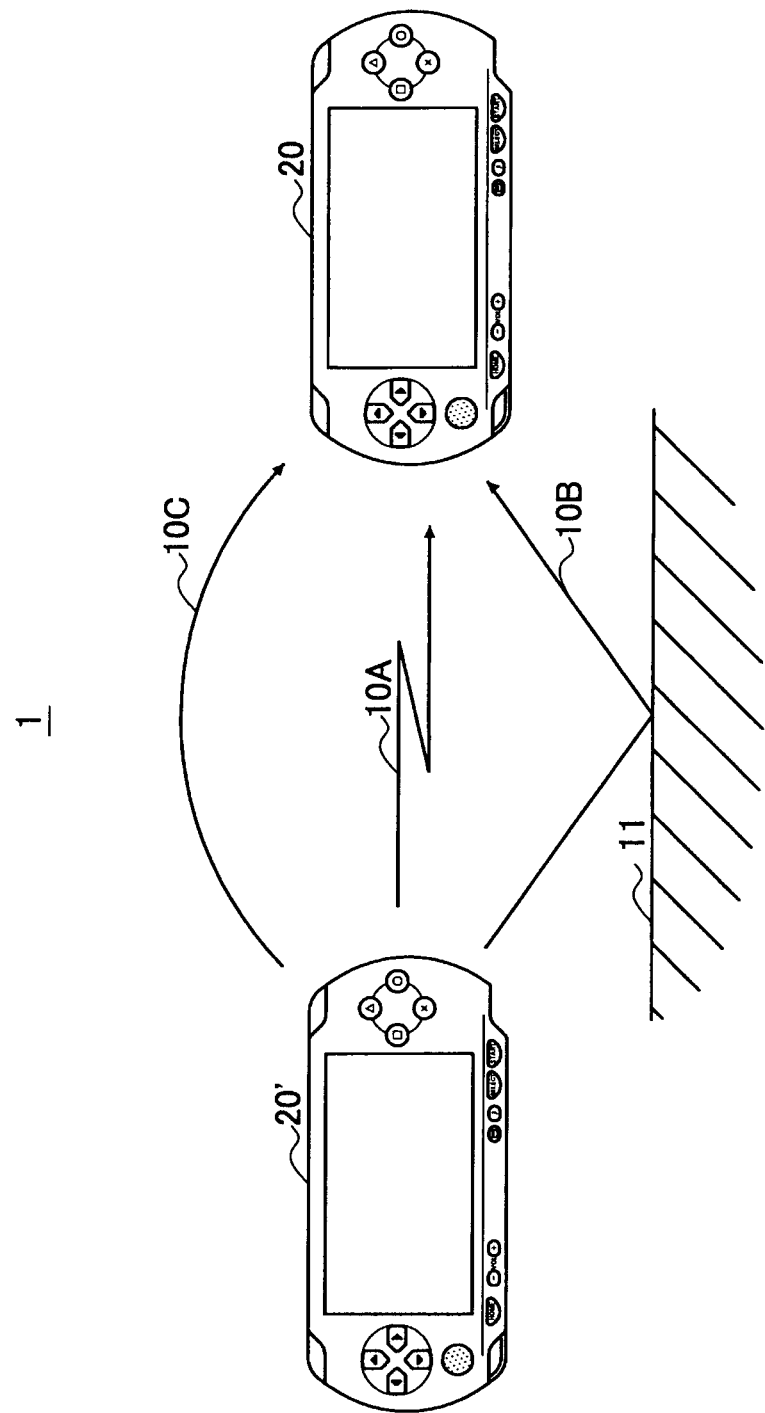
FIG. 1 is an explanatory view showing a configuration of a radio communication system according to the present embodiment.

FIG. 1 is an explanatory view showing a configuration of the radio communication system 1 according to the first embodiment. As shown in FIG. 1, the radio communication system 1 according to the present embodiment includes a plurality of radio communication devices 20 and 20'.

The radio communication devices 20 and 20' are capable of transmitting/receiving radio signals including various data (streaming data, distance measurement packets and the like) to/from each other. The various data include audio data such as music, lectures and radio programs, video data such as movies, TV programs, video programs, photographs, documents, paintings and graphic charts or other any data such as games and software.

Further, in FIG. 1, portable game machines are shown as examples of the radio communication devices 20 and 20'; however, the radio communication devices 20 and 20' are not limited to those portable game machines. For example, the radio communication devices 20 and 20' may be information processing devices such as PCs (Personal Computers), household video processors (DVD recorder, videocassette recorder and the like), mobile phones, PHSs (Personal Handyphone Systems), portable music players, portable video processors, PDAs (Personal Digital Assistants), household game machines and household electric appliances.

Here, the radio communication devices 20 and 20' may perform radio communication using a frequency bandwidth of 2.4 GHz that is specified in IEEE 802.11b or may perform radio communication using a frequency bandwidth specified in IEEE 802.11a, g and n. Further, the radio communication devices 20 and 20' may operate using ZigBee that is specified in IEEE 802.15.4. Further, FIG. 1 shows the radio communication system 1 of an ad-hoc mode in which the radio communication devices 20 and 20' directly communicate with each other (without relaying on a radio base station); however, the radio communication system 1 may be in an infrastructure mode in which the radio communication devices 20 and 20' communicate via a base station. Furthermore, in the radio communication system 1, in addition to point-to-point radio communication but also point-to-multipoint or multipoint-to-multipoint radio communication can be realized.

The field intensity of a radio signal transmitted from the radio communication device 20 or 20' are affected by interference fading, polarization fading, skip fading or the like. Interference fading is a phenomenon in which radio signals, which are propagated via a plurality of paths and come to a receiving point, interfere with each other at the receiving point. Further, polarization fading is a phenomenon in which a rotation of a plane of polarization occurs during a propagation of radio signals and radio waves having different planes of polarization interfere with each other at a receiving point. Furthermore, skip fading is a phenomenon in which an interference occurs due to an affect of the ionosphere around the earth.

For example, as shown in FIG. 1, when the radio communication device 20' transmits a radio signal, the radio communication device 20 receives the radio signal as a direct wave 10A, a reflected wave 10B (reflected by a subject 11) or a diffracted wave 10C, for example.

Thus, the field intensity of the radio signal received by the radio communication device 20 from the radio communication device 20' constantly varies. Particularly, since the portable game machines described as examples of the radio communication devices 20 and 20' have a low transmitting power, those portable game machines are easily affected by fading. Thus, a radio communication device cannot estimate an accurate distance from the transmission source device of the radio signal by using the field intensity of all radio signals received in a certain period of time.

Thus, in view of the above issue, the radio communication device 20 according to the first embodiment has been created. In the radio communication device 20 according to the first embodiment, a distance from a transmission source of a radio signal can be estimated with a higher degree of accuracy. The radio communication device 20 will be described in detail with reference to FIGS. 2 to 15.

[2] Radio Communication Device According to First Embodiment

Figure 2:
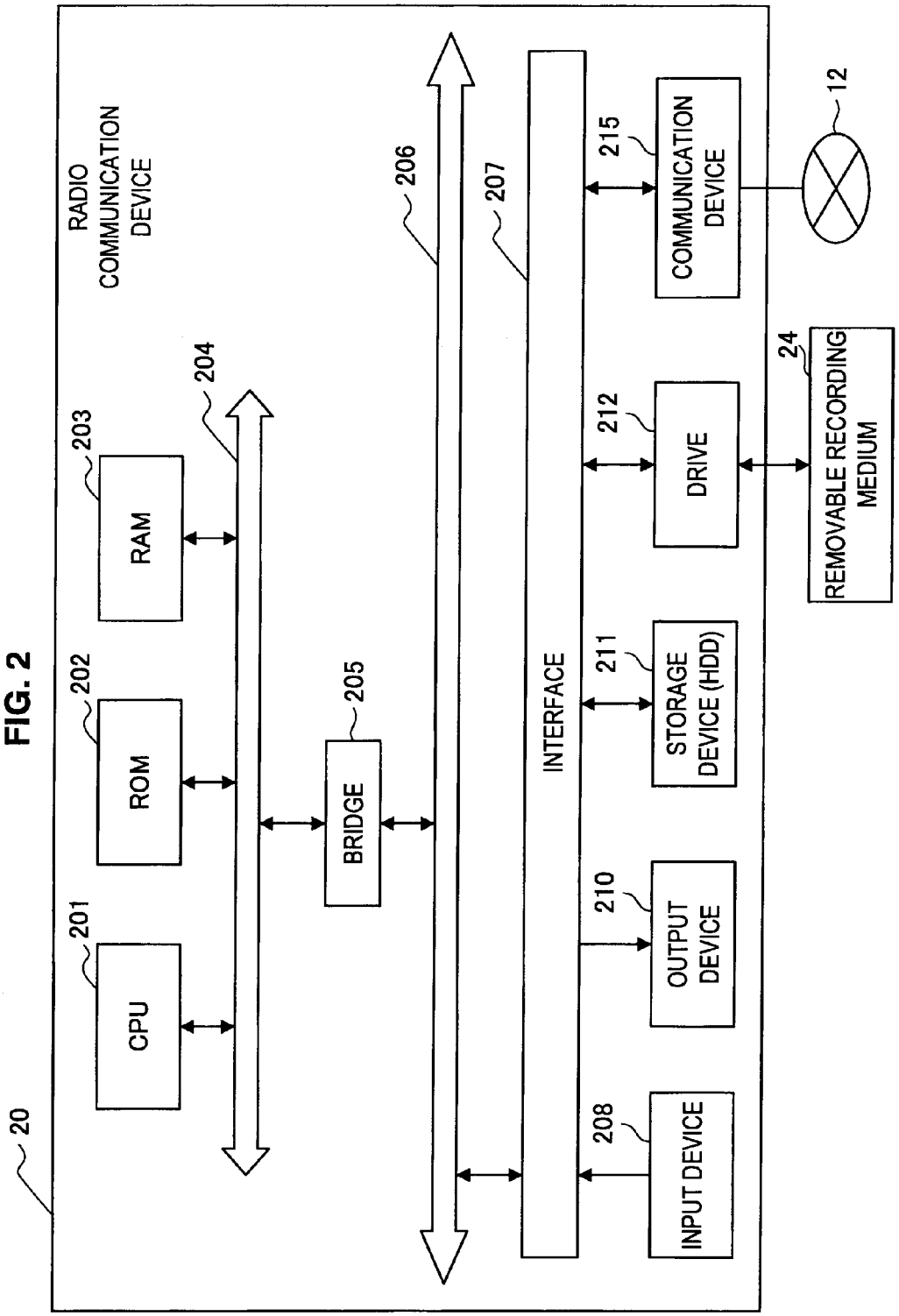
FIG. 2 is a block diagram showing a hardware configuration of a radio communication device.

[2-1] Hardware Configuration of Radio Communication Device According to the First Embodiment FIG. 2 is a block diagram showing a hardware configuration of the radio communication device 20. The radio communication device 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212 and a communication device 215.

The CPU 201 functions as an arithmetic processing device and a control device, and controls the overall operation of the radio communication device 20 according to various programs. Further, the CPU 201 can be a microprocessor. The ROM 202 stores programs, arithmetic parameters and the like which are used by the CPU 201. The RAM 203 temporarily stores programs used by the CPU 201 and parameters and the like which varies as appropriate during an implementation of the programs. These are connected to one another by the host bus 204 composed of a CPU bus and the like.

The host bus 204 is connected to the external bus 206 such as a PCI (Peripheral Component Interconnect/Interface) bus via the bridge 205. Note that the host bus 204, bridge 205 and external bus 206 do not have to be separately provided and those functions may be mounted in a single bus.

The input device 208 is composed of an input means, which is used by a user to input information, such as a mouse, a keyboard, a touch panel, a button, a microphone, a switch and a lever, and an input control circuit for generating input signals based of user's input and outputting to the CPU 201. By operating the input device 208, the user of the radio communication device 20 can input various data and instruct processing operation to the radio communication device 20.

The output device 210 is composed of a display device such as a CRT (Cathode Ray Tube) display device, a liquid crystal display (LCD) device, an OLED (Organic Light Emitting Diode) device and a lamp, and an audio output device such as a speaker and a headphone. The output device 210 outputs a reproduced content, for example. Specifically, the display device displays various information such as reproduced video data and the like in form of texts or images. On the other hand, the audio output device converts reproduced sound data and the like to sound and outputs the sound.

The storage device 211 is a data storing device composed as an example of a memory unit of the radio communication device 20 according to the present embodiment. The storage device 211 may include a storage medium, a recording device for recording data to the storage medium, a readout device for reading data from the storage medium, a deletion device for deleting data recorded in the storage medium, and the like. The storage device 211 is composed of a HDD (Hard Disk Drive) for example. The storage device 211 drives a hard disk and stores programs and various data which are executed by the CPU 201. Further, in the storage device 211, later described field intensity, noise floor and the like are recorded in association with users.

The drive 212 is a reader/writer for a storage medium and internally mounted in or externally connected to the radio communication device 20. The drive 212 reads information from an attached magnetic disc, optical disc, magnetic-optical disc, or a removable recording memory 24 such as a semiconductor memory, and outputs to the RAM 203.

The communication device 215 is a communication interface composed of a communication device for connecting to a communication network 12, for example. Further, the communication device 215 may be a communication device for a wireless LAN, a communication device for a wireless USB, or a wired communication device for a wired communication. The communication device 215 transmits/receives radio signals to/from other radio communication device 20'.

Here, the hardware configuration of the radio communication device 20' can substantially be the same as the hardware configuration of the above described radio communication device 20, so the detailed description will be omitted.

[2-2] Functions of Radio Communication Device According to First Embodiment

The hardware configuration of the radio communication device 20 has been described with reference to FIG. 2. Next, functions of the radio communication device 20 according to the present embodiment will be described.

Figure 3:
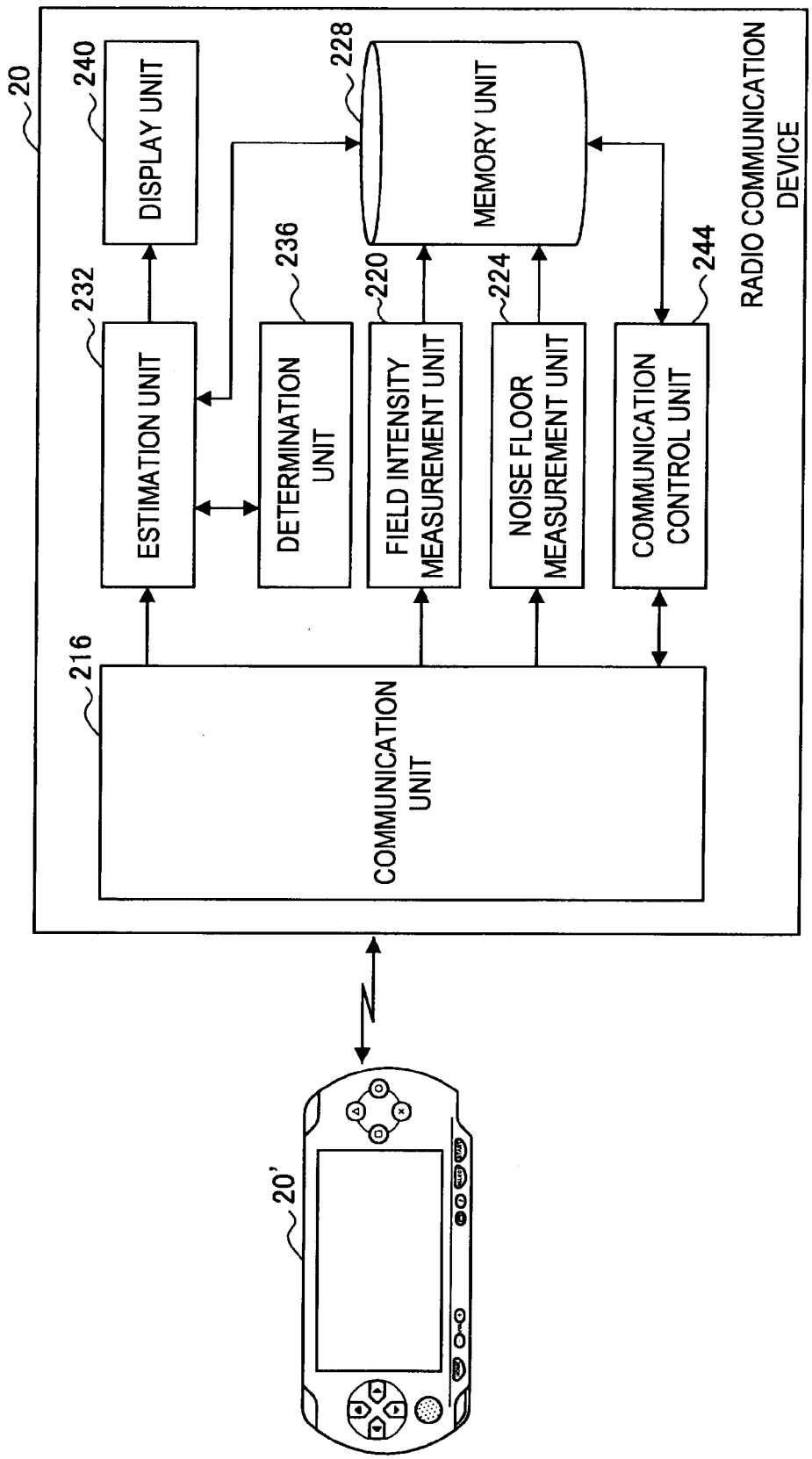
FIG. 3 is a functional block diagram showing a configuration of the radio communication device.

FIG. 3 is a functional block diagram showing the configuration of the radio communication device 20 according to the first embodiment. As shown in FIG. 3, the radio communication device 20 includes a communication unit 216, a field intensity measurement unit 220, a noise floor measurement unit 224, a memory unit 228, an estimation unit 232, a judgment unit 236, a display unit 240 and a communication control unit 244.

The communication unit 216 is an interface for transmitting/receiving radio signals such as a distance measurement packet or streaming data to/from other radio communication device 20' and has functions as a transmission unit and a reception unit.

The other radio communication device 20' generates a distance measurement packet and periodically transmits to the radio communication device 20. The distance measurement packet is a packet used by the radio communication device 20 to measure the distance between the radio communication device 20 and the radio communication device 20'. When there are data to be transmitted from the other radio communication device 20' to the radio communication device 20, the data can be included in the distance measurement packet. Further, the distance measurement packet has a data amount equal to or greater than 1 byte. Note that the radio communication device 20 can estimate the distance from the radio communication device 20' based on the streaming data without using the distance measurement packet.

Further, the communication unit 216 receives device information that indicates a transmitting power of the radio communication device 20' before receiving the distance measurement packet.

Figure 4:
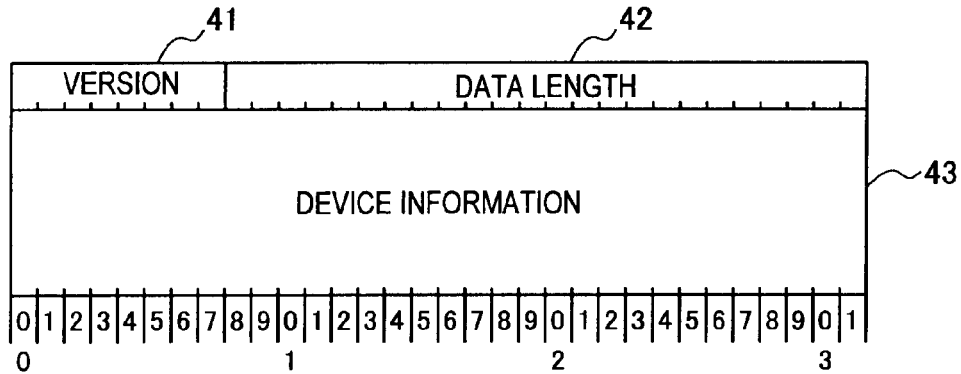
FIG. 4 is an explanatory view showing a configuration example of packet including device information.

FIG. 4 is an explanatory view showing an example of a packet configuration including device information. This packet includes, as shown in FIG. 4, a version 41 which is 8 bytes in length and is a value of format version of the packet, a data length 42 of the packet and device information 32.

Figure 5:
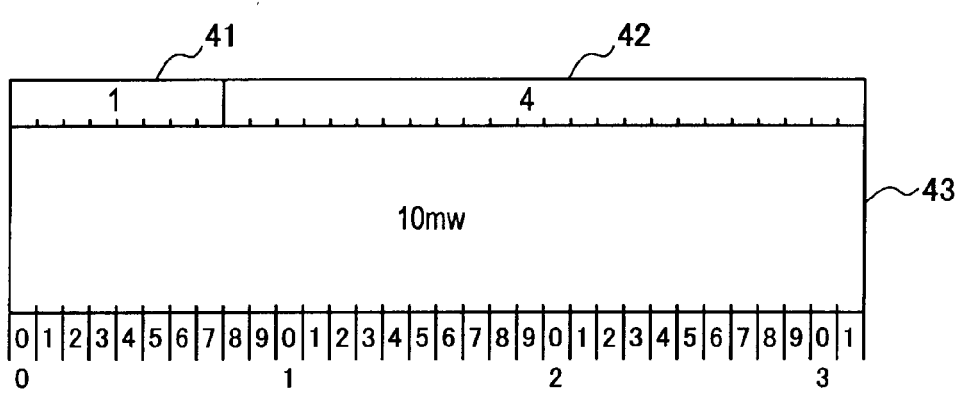
FIG. 5 is an explanatory view showing an illustrative example of the packet including the device information.
Figure 6:
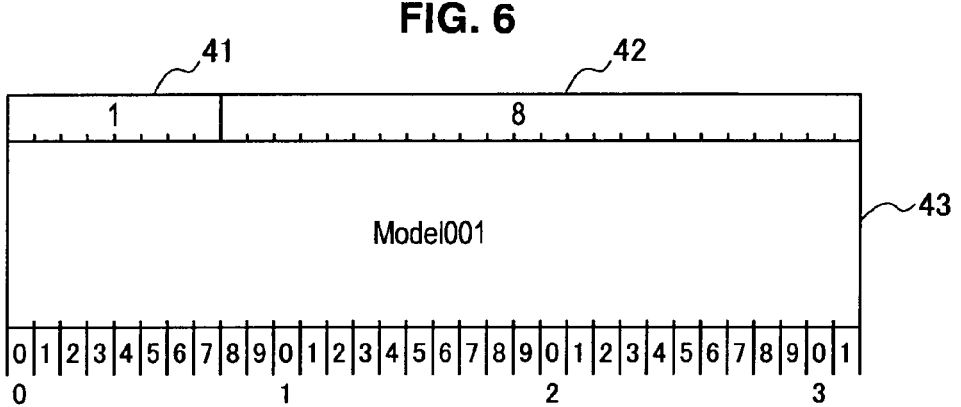
FIG. 6 is an explanatory view showing an illustrative example of the packet including the device information.

FIGS. 5 and 6 are explanatory views showing illustrative examples of a packet including device information. In the example shown in FIG. 5, the version 41 is "1," the data length 42 is "4," and the device information 32 is "10 mw." The "10 mw" written as the device information 32 is a transmitting power of the radio communication device 20' upon transmitting a radio signal.

Further, in the example shown in FIG. 6, the version 41 is "1," the data length 42 is "8," and the device information 32 is "Model001." The "Model001" written as the device information 32 is an antenna type of the radio communication device 20' or radio communication device 20'. Base on the type, a transmitting power of the radio communication device 20' can be specified.

As described above, since the communication unit 216 receives device information including a transmitting power or a type of the radio communication device 20' in advance, the estimation unit 232 is allowed to estimate the distance from the radio communication device 20' according to the content of the device information. Note that the format of the packet including the device information is not limited to the example shown in FIG. 4 and any format such as a serial number of the radio communication device 20' can be used if it can be recognized between applications (programs) of the radio communication device 20 and radio communication device 20'.

The field intensity measurement unit 220 has a function as a measurement unit for measuring a field intensity (reception intensity) of the distance measurement packet received by the communication unit 216. The field intensity measurement unit 220 may obtain the field intensity from an API (Application Program Interface), a function, a driver applicable to a wireless hardware, or the like.

The noise floor measurement unit 224 measures a noise floor indicating a level of noise included in the distance measurement packet received by the communication unit 216. In general, differently from an S/N (signal-to-noise) ratio, a greater value of the noise floor indicates a worse radio wave environment (a larger noise component) and a smaller value indicates a better radio wave environment (a smaller noise component). The noise floor measurement unit 224 may obtain the noise floor from an API (Application Program Interface), a function, a driver applicable to a wireless hardware, or the like.

The memory unit 228 stores the field intensity of the distance measurement packet that is measured by the field intensity measurement unit 220 and the noise floor of the distance measurement packet that is measured by the noise floor measurement unit 224. Further, the memory unit 228 stores the device information received by the communication unit 216 in advance in association with a later described threshold value N and threshold value F, an evaluation formula or the like.

Here, the memory unit 228 may be a storage medium of a nonvolatile memory such as an EEPROM (Electrically Erasable Programmable Read-Only Memory) and an EPROM (Erasable Programmable Read Only Memory), a magnetic disc such as a hard disk and a magnetic substance disk, an optical disc such as a CD-R (Compact Disc Recordable), a /RW (ReWritable), a DVD-R (Digital Versatile Disc Recordable) a /RW/+R/+RW/RAM (Ramdam Access Memory) and a BD (Blu-Ray Disc (registered trademark)) -R/BD-RE, or an MO (Magneto Optical) disc.

The estimation unit 232 estimates a distance from the radio communication device 20' using the field intensity and the noise floor value, which is determined by the determination unit 236 to satisfy a predetermined condition, among the field intensities and noise floor values stored in memory unit 228. Hereinafter, a judgment by the judgment unit 236 will be described after a specific description of the functions of the estimation unit 232.

Firstly, the estimation unit 232 maintains a pair of a field intensity and a noise floor value which is determined by the determination unit 236 to satisfy a predetermined condition as a distance measurement database. Then, when the following condition A is satisfied, a distance measurement evaluation value is calculated.
(Condition A)
1. A set period has passed.
2. The number of pairs of the field intensity and noise floor value is increased by a constant number.
3. The accumulated number of pairs of the field intensity and noise floor value excesses a certain value.
One of the above 1 to 3 or a combination.

Figures 7, 8:
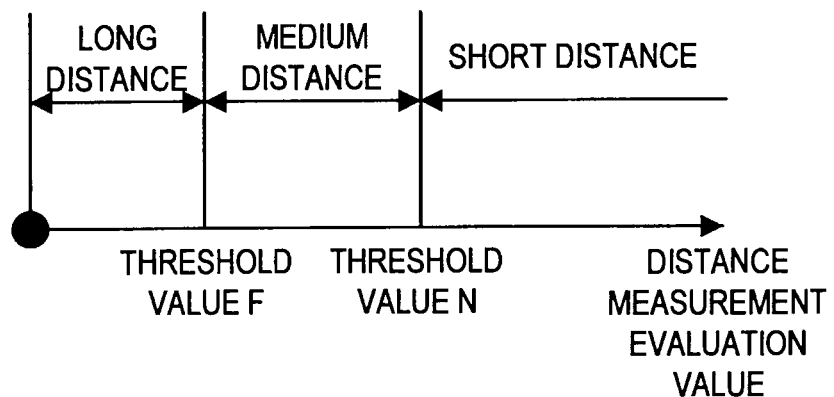
FIG. 7 is an explanatory view showing a relationship between distance measurement evaluation values and estimated distances.
FIG. 8 is an explanatory view showing an example in which device information and evaluation formula are stored in association with each other in a memory unit.

Note that the distance measurement evaluation value may be an average value of field intensities in the distance measurement database or a latest field intensity. As shown in FIG. 7, for example, the estimation unit 232 estimates the distance between the radio communication devices 20 and 20' based on the amount of the distance measurement evaluation value.

FIG. 7 is an explanatory view showing a relationship between distance measurement evaluation values and estimated distances. As shown in FIG. 7, when the distance measurement evaluation value is smaller than the threshold value F, the estimation unit 232 estimates that the distance between the radio communication devices 20 and 20' is a long distance. Further, when the distance measurement evaluation value is greater than the threshold value N, the estimation unit 232 estimates that the distance between the radio communication devices 20 and 20' is a short distance. Further, when the distance measurement evaluation value is equal to or greater than the threshold value F or equal to or smaller than the threshold value N, the estimation unit 232 estimates that the distance between the radio communication devices 20 and 20' is a medium distance.

Note that the threshold value N and threshold value F may be stored in association with device information in the memory unit 228. In this case, the estimation unit 232 may extract the threshold value N and threshold value F from the memory unit 228, which correspond to the device information received from the radio communication device 20' in advance. It is assumed that the threshold value N and threshold value F associated with device information that indicates a relatively high transmitting power tend to be relatively great values.

Further, as a substitute for the threshold value N and threshold value F, a evaluation formula for calculating a distance measurement evaluation value may be associated with the device information and stored in the memory unit 228 as shown in FIG. 8.

FIG. 8 is an explanatory view showing an example in which device information and evaluation formulas are associated and stored in the memory unit 228. More specifically, device information "Model001" is associated with an evaluation formula 1, device information "Model001" is associated with an evaluation formula 1, device information "Model002" is associated with an evaluation formula 2. Device information "Model003" and device information "Model004" are also associated with evaluation formulas.

For example, the evaluation formula 1 may be (added value of latest three field intensities)/3, and the evaluation formula 2 may be (added value of latest three field intensities)/4.

Since each radio communication device 20' has different antenna shape, product shape, transmitting power or the like, in the radio communication device 20, it has been difficult to accurately estimate the distance between the radio communication devices 20 and 20' based on only the field intensity. Thus, when the device information is associated with a threshold value N, a threshold value F, and an evaluation formula and stored in the memory unit 228, the estimation unit 232 can perform a distance estimation for the radio communication device 20'.

The determination unit 236 determines whether the pair of the field intensity and noise floor value stored in the memory unit 228 satisfy a predetermined condition. Here, when the noise floor value is greater than an upper limit set value, it is assumed that the reception environment for receiving the distance measurement packet by the communication unit 216 is remarkably deteriorated. Further, when the noise floor value is lower than a lower limit set value, it is assumed that the reception environment for receiving the distance measurement packet by the communication unit 216 is excessively good. Thus, when the noise floor value is greater than the lower limit set value and lower than the upper limit set value, it is assumed that the reception environment for receiving the distance measurement packet by the communication unit 216 is almost in a steady state.

Thus, among the pairs of the field intensity and noise floor value, the determination unit 236 determines that a pair having a noise floor value that is equal to or greater than the lower limit set value and equal to or lower than the upper limit set value satisfies the predetermined condition and adds the pair to the distance measurement database maintained by the estimation unit 232. In other words, the determination unit 236 filters a pair of the field intensity and noise floor value that is to be used by the estimation unit 232 among the pairs of the field intensity and noise floor value stored in the memory unit 228. Note that the determination unit 236 may perform filtering when a pair of the field intensity and noise floor is recorded in the memory unit 228. A manner of filtering by the determination unit 236 will be described with reference to FIGS. 9 and 10.

Figure 9:
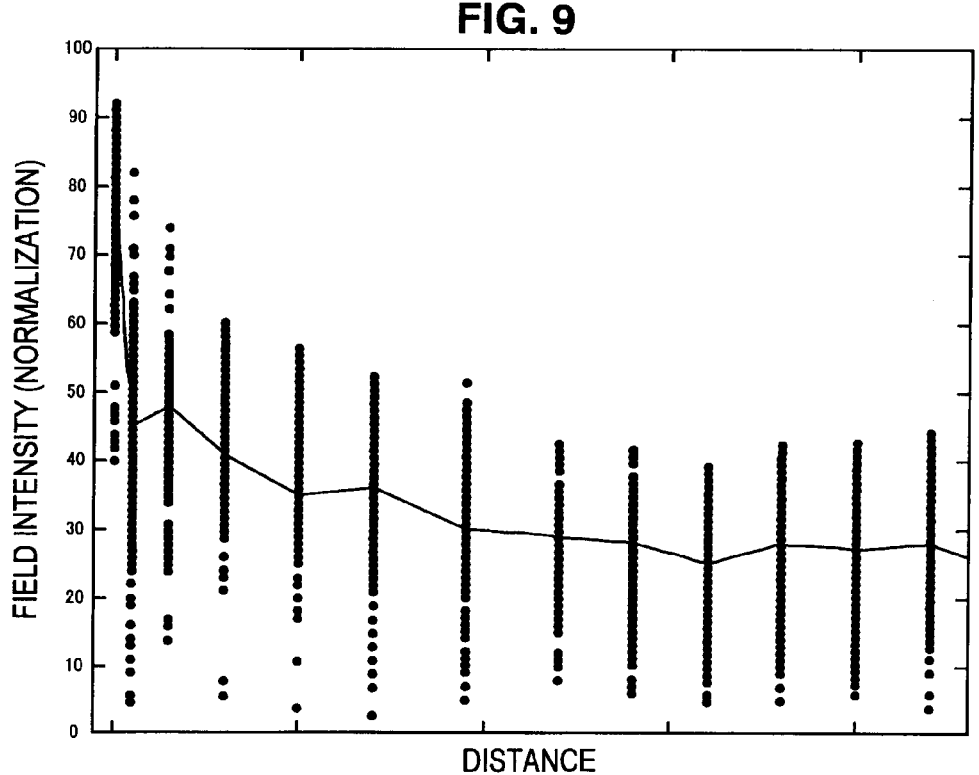
FIG. 9 is an explanatory view showing an illustrative example of distances between a plurality of radio communication devices and field intensities before filtering by a determination unit.

FIG. 9 is an explanatory view showing an illustrative example of distances between the radio communication devices 20 and 20' and the field intensities before filtering by the determination unit 236. More specifically, FIG. 9 shows field intensities obtained in respective distances as changing the distance between the radio communication devices 20 and 20' to a plurality of distances. As shown in FIG. 9, before filtering by the determination unit 236, the obtained field intensity varies in a range even when the distance of the radio communication devices 20 and 20' is the same.

Figure 10:
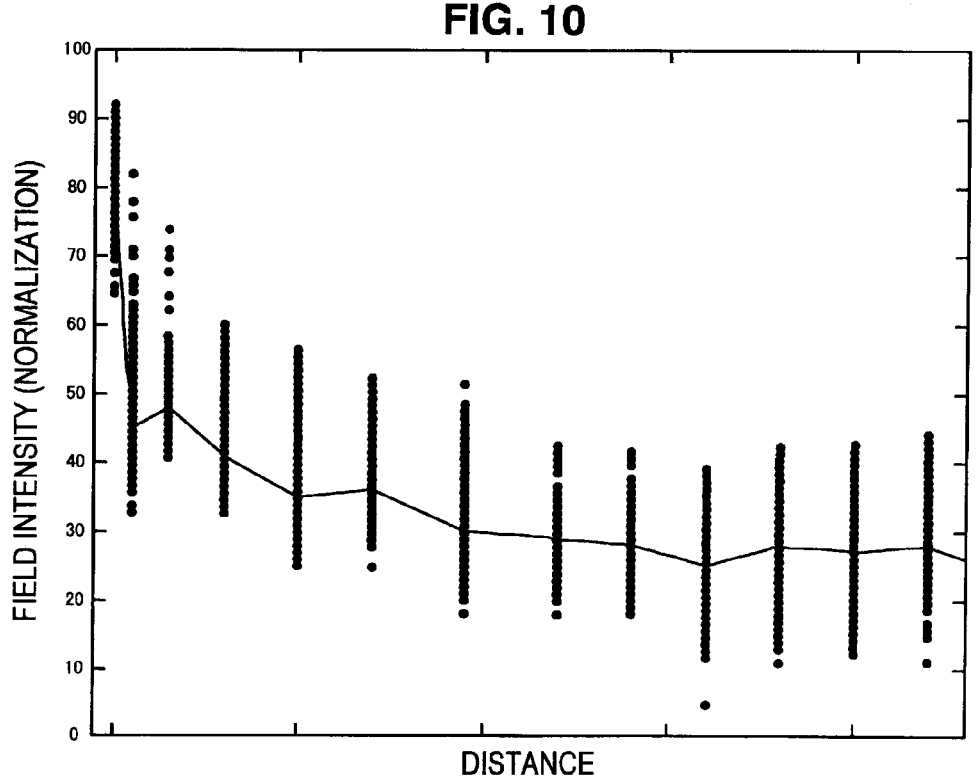
FIG. 10 is an explanatory view showing an illustrative example of distances between a plurality of radio communication devices and field intensities after filtering by the determination unit.

FIG. 10 is an explanatory view showing an illustrative example of distances between the radio communication devices 20 and 20' and the field intensities after filtering by the determination unit 236. As shown in FIG. 10, after the filtering by the determination unit 236, the range in which the field intensity varies is smaller while the distance between the radio communication devices 20 and 20' is the same compared to the case before the filtering by the determination unit 236.

As described above, when the field intensity used by the estimation unit 232 is filtered by the determination unit 236 based on the noise floor value, the estimation unit 232 can estimate distance between the radio communication devices 20 and 20' based on reliable field intensities. As a result, the accuracy of distance estimation by the estimation unit 232 will be improved. Hereinafter, an illustrative example of the distance estimation by the estimation unit 232 will be described with reference to FIG. 11.

Figure 11:
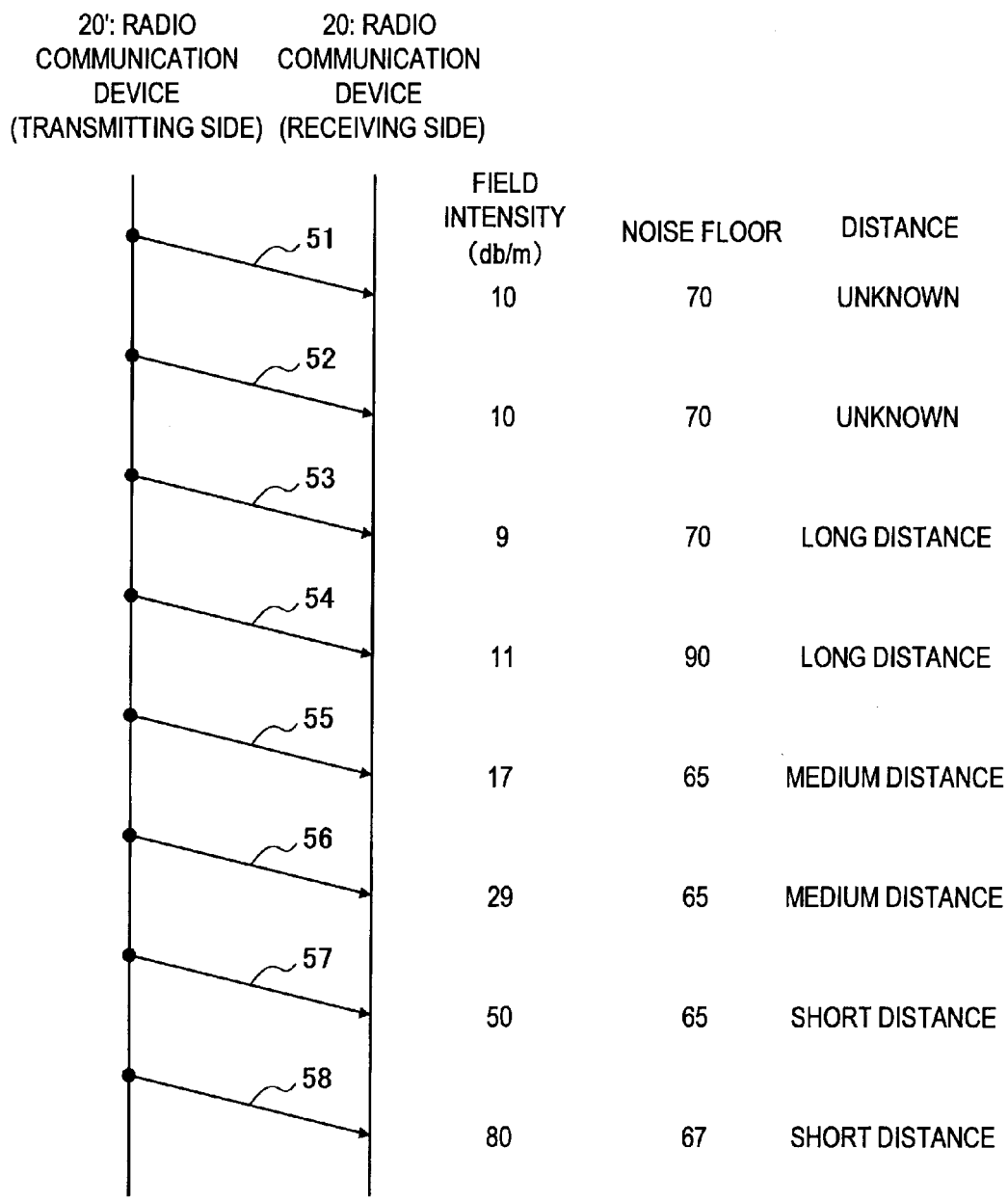
FIG. 11 is an explanatory view showing an illustrative example of a distance estimation by an estimation unit.

FIG. 11 is an explanatory view showing an illustrative example of a distance estimation by the estimation unit 232. Here, it is assumed that, in the condition A, three or more pairs of the field intensity and noise floor value are stored as the distance measurement database, and the lower limit set value is 50 and the upper limit set value is 70, which are used for filtering by the determination unit 236. The estimation unit 232 calculates a distance measurement evaluation value by averaging the last three field intensities and sets as threshold value F=10 and threshold value N=30.

As described in FIG. 11, firstly, the radio communication device 20 receives the distance measurement packet 51. Then, the radio communication device 20 measures a field intensity of the distance measurement packet 51 as 10 db/m and a noise floor as 70. Since the noise floor of the distance measurement packet 51 satisfies the predetermined condition of the determination unit 236, the pair of the field intensity and noise floor of the distance measurement packet 51 is maintained as a distance measurement database in the estimation unit 232. However, the number of the pairs of the field intensity and noise floor maintained as the distance measurement database in the estimation unit 232 has not reached three, so the estimation unit 232 concludes that the condition A is not satisfied and the distance from the radio communication device 20' is unknown.

Next, the radio communication device 20 receives a distance measurement packet 52. Then, the radio communication device 20 measures the field intensity of the distance measurement packet 52 as 10 db/m and the noise floor as 70. Since the noise floor of the distance measurement packet 52 satisfies the predetermined condition of the determination unit 236, the pair of the field intensity and noise floor of the distance measurement packet 52 is stored as the distance measurement database in the estimation unit 232. However, the number of the pairs of the field intensity and noise floor maintained as the distance measurement database of the estimation unit 232 has not reached three, so the estimation unit 232 concludes that the condition A is not satisfied and the distance from the radio communication device 20' is unknown.

After that, the radio communication device 20 receives a distance measurement packet 53. Then, the radio communication device 20 measures the field intensity of the distance measurement packet 53 as 9 db/m and the noise floor as 70. Since the noise floor of the distance measurement packet 53 satisfies the predetermined condition of the determination unit 236, the pair of the field intensity and noise floor of the distance measurement packet 53 is maintained as the distance measurement database in the estimation unit 232. Further, the number of pairs of the field intensity and noise floor maintained as the distance measurement database of the estimation unit 232 has reached three, so the estimation unit 232 calculates the distance measurement evaluation value as (10+10+9)/3=9.666 . . . . Since this distance measurement evaluation value is smaller than the threshold value F, the estimation unit 232 estimates that the distance from the radio communication device 20' is a long distance.

Further, the radio communication device 20 receives a distance measurement packet 54. Then, the radio communication device 20 measures the field intensity of the distance measurement packet 54 as 11 db/m and the noise floor as 90. The noise floor of the distance measurement packet 54 does not satisfy the predetermined condition (the upper limit set value is greater than 70) of the judgment unit 236, the pair of the field intensity and noise floor of the distance measurement packet 54 is not used by the estimation unit 232. However, the number of pairs of the field intensity and noise floor maintained as the distance measurement database in the estimation unit 232 has reached three, so the estimation unit 232 calculates the distance measurement evaluation value as (10+10+9)/3=9.666 . . . . Since this distance measurement evaluation value is smaller than the threshold value F, the estimation unit 232 estimates the distance from the radio communication device 20' is a long distance.

Next, the radio communication device 20 receives a distance measurement packet 55. Then, the radio communication device 20 measures the field intensity of the distance measurement packet 55 as 17 db/m and the noise floor as 65. Since the noise floor of the distance measurement packet 55 satisfies the predetermined condition of the determination unit 236, the pair of the field intensity and noise floor of the distance measurement packet 55 is maintained as the distance measurement database in the estimation unit 232. Further, the number of pairs of the field intensity and noise floor maintained as the distance measurement database of the estimation unit 232 has reached three, so the estimation unit 232 calculates the distance measurement evaluation value as (10+9+17)/3=12. Since this distance measurement evaluation value is greater than the threshold value F and smaller than the threshold value N, the estimation unit 232 estimates that the distance from the radio communication device 20' is a medium distance.

When distance measurement packets 56 to 58 are received, the estimation unit 232 operates in the same manner and estimates that the distance from the radio communication device 20' approaches to a short distance, as described below in detail. The distance from the radio communication device 20' estimated by the estimation unit 232 may be displayed on the display unit 240. Further, the distance from the radio communication device 20' estimated by the estimation unit 232 may be used in a selected application.

Here, back to the explanation of the configuration of the radio communication device 20 with reference to FIG. 3, the communication control unit 244 has a function as a control unit for controlling a distance measurement packet transmission by the communication unit 216. Hereinafter, the purpose of the provision of the communication control unit 244 and detail functions thereof will be described.

As described with reference to FIG. 11, the radio communication device 20 can estimate the distance from the radio communication device 20' by receiving a distance measurement packet from the radio communication device 20'. Further, as a method that the radio communication device 20' estimates the distance from the radio communication device 20, a method that a distance measurement packet is sent from the radio communication device 20 can be considered.

However, if the radio communication device 20 simply transmits a distance measurement packet every predetermined period even when the radio communication device 20' has not been in a radio wave coverage, the communication resource is used unnecessarily.

Here, when the radio communication device 20 has received a distance measurement packet from the radio communication device 20', it is likely that the radio communication device 20' is in the radio wave coverage of the radio communication device 20. On the other hand, when the radio communication device 20 cannot receive a distance measurement packet from the radio communication device 20', it is likely that the radio communication device 20' is out of the radio wave coverage of the radio communication device 20 or the packet may be lost due to a deteriorated radio wave condition.

Then, for example, the radio communication device 20' is considered as a client, the radio communication device 20 is considered as a server, and the communication control unit 244 is assumed to control to transmit a distance measurement packet to the communication unit 216 when a distance measurement packet from the radio communication device 20' is received. Here, it is assumed that the radio communication device 20' transmits a distance measurement packet every predetermined period (a period of 100 ms, for example).

With the above described configuration, since the communication control unit 244 controls the communication unit 216 to transmit a radio signal in response to a reception of a distance measurement packet, transmission of distance measurement packets which will not reach the radio communication device 20' can be prevented so that the usage of the communication resource amount can be reduced. An illustrative example of radio communication controlled by such communication control unit 244 is shown in FIG. 12.

Figure 12:
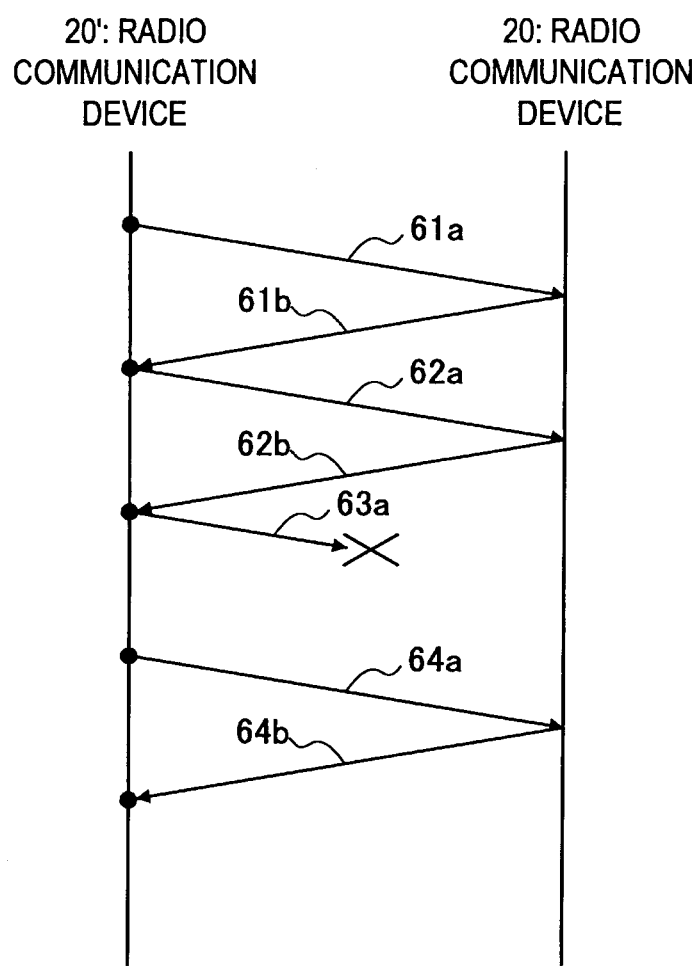
FIG. 12 is an explanatory view showing an illustrative example of radio communication controlled by a communication control unit.

FIG. 12 is an explanatory view showing the illustrative example of the radio communication controlled by the communication control unit 244. As shown in FIG. 12, the radio communication device 20' periodically transmits distance measurement packets 61a, 62a, 63a and 64a. The radio communication device 20 transmits a distance measurement packet 61b in response to a reception of the distance measurement packet 61a. Further, the radio communication device 20 transmits a distance measurement packet 62b in response to a reception of the distance measurement packet 62a.

On the other hand, since the distance measurement packet 63a transmitted from the radio communication device 20' does not reach the radio communication device 20, the radio communication device 20 does not transmit a distance measurement packet to respond the distance measurement packet 63a. After that, the radio communication device 20 transmits a distance measurement packet 64b in response to a reception of the distance measurement packet 64a. Here, the radio communication device 20 may perform transmitting the distance measurement packet and recoding the field intensity and noise floor of the received distance measurement packet to the memory unit 228, in series or in parallel. Further, the communication control unit 244 may have a function for generating a distance measurement packet.

Here, since the radio communication device 20' can have substantially the same function as that of the radio communication device 20, explanation of detail functions of the radio communication device 20' is omitted.

[2-3] Operation of Radio Communication Device According to First Embodiment

Functions of the radio communication device 20 according to the present embodiment have been described with reference to FIGS. 2 to 12. Next, a radio communication method executed between the radio communication device 20 and the radio communication device 20' will be described with reference to FIGS. 13 to 15.

Figure 13:
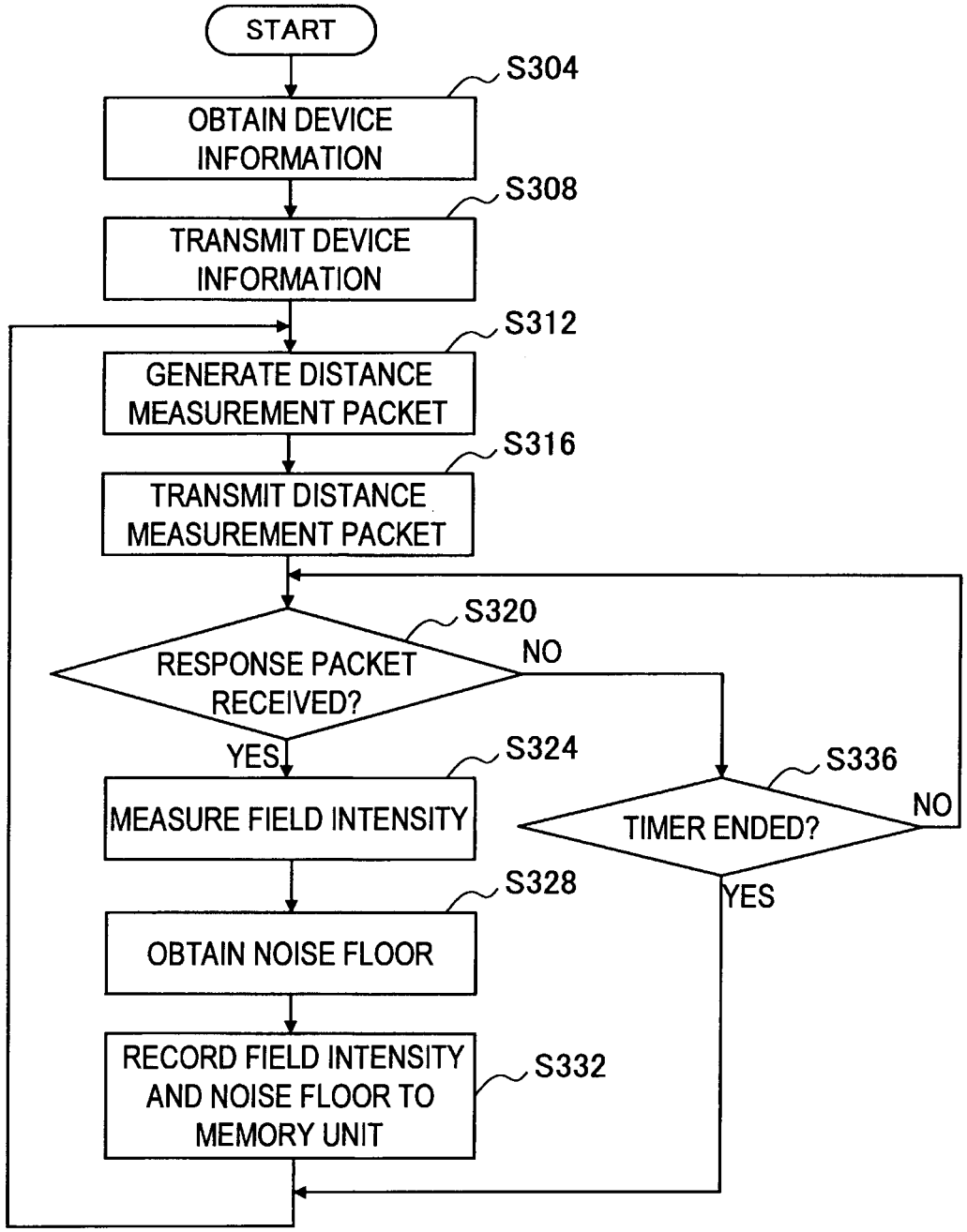
FIG. 13 is a flowchart showing an operation flow of a radio communication device on transmitting side.

FIG. 13 is a flowchart showing an operation flow of the radio communication device 20' on the transmitting side. As shown in FIG. 13, firstly, the radio communication device 20' obtains device information thereof (S304) and transmits the device information to the radio communication device 20 on the receiving side (S308).

After that, the radio communication device 20' generates a distance measurement packet (S312) and transmits the distance measurement packet to the radio communication device 20 on the receiving side (S316). Then, when the radio communication device 20' receives a distance measurement packet from the radio communication device 20 as a response to the transmitted distance measurement packet (S320), the radio communication device 20' measures a field intensity of the received distance measurement packet (S324). Further, the radio communication device 20' obtains a noise floor of the received distance measurement packet (S328). Then, the radio communication device 20' records the field intensity and noise floor to a memory unit (corresponding to the memory unit 228 in FIG. 3) (S332).

Further, when the distance measurement packet is transmitted to the radio communication device 20 on the receiving side (S316) but a distance measurement packet is not received as a response from the radio communication device 20 (S320), the radio communication device 20' determines whether a timer has ended (S336). When the time has ended, the radio communication device 20' repeats the process from S312 and, when the time has not ended, the radio communication device 20' repeats the process from S320.

Figure 14:
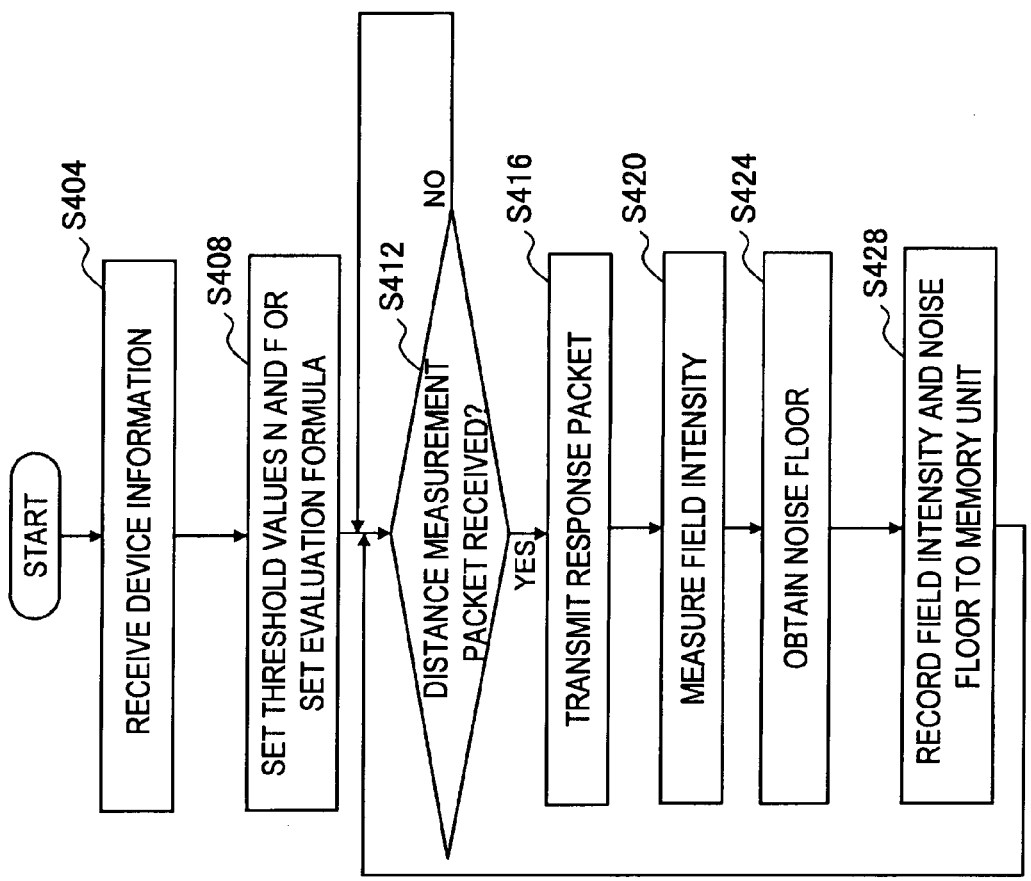
FIG. 14 is a flowchart showing an operation flow of a radio communication device on receiving side.
Figure 15:
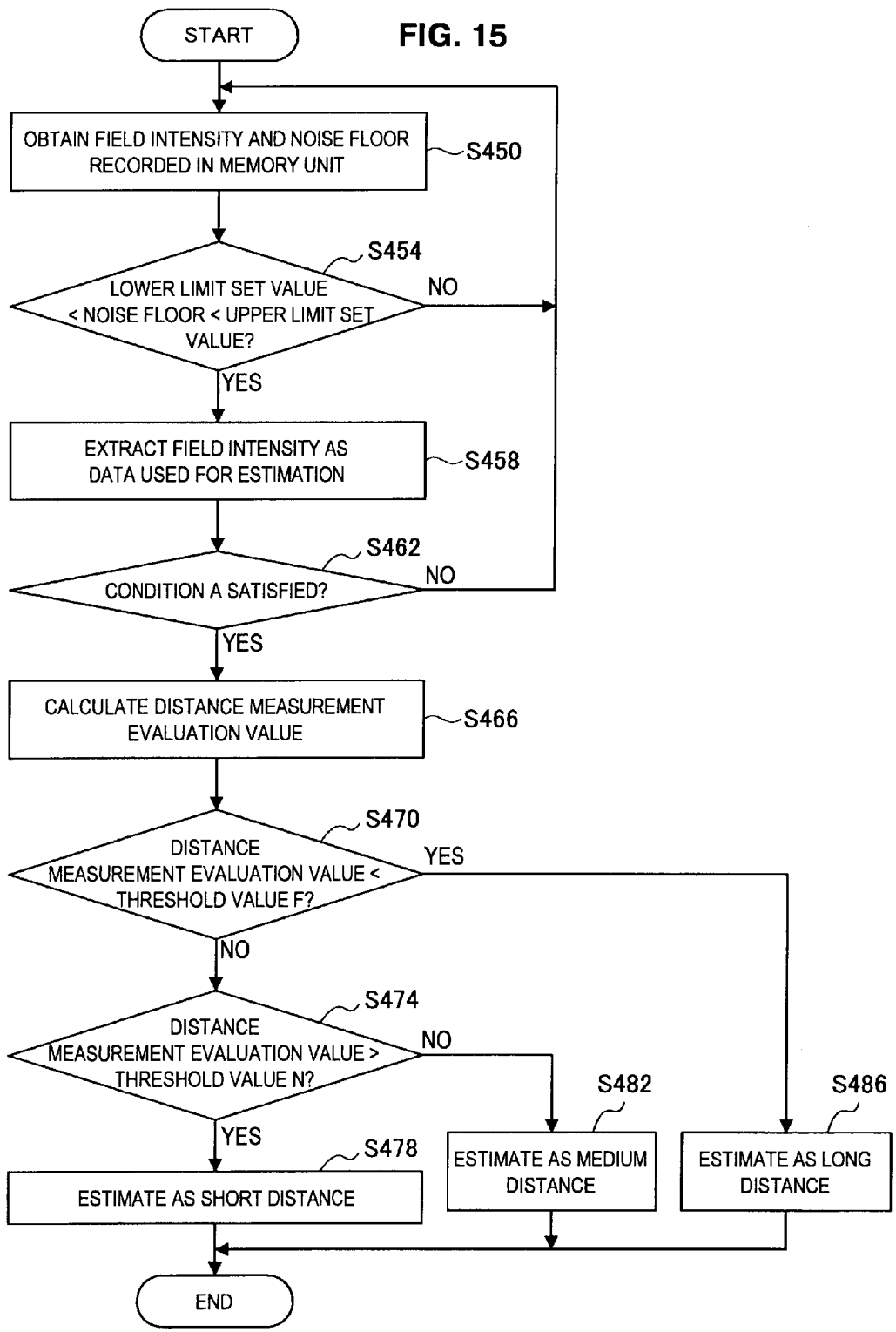
FIG. 15 is a flowchart showing an operation flow of a radio communication device on receiving side.

FIGS. 14 and 15 are flowcharts showing operation flows of the radio communication device 20 on the receiving side. As shown in FIG. 14, firstly, the radio communication device 20 receives device information of the radio communication device 20' from the radio communication device 20' (S404). Then, the estimation unit 232 sets threshold values N and F or an evaluation formula to threshold values N and F or an evaluation formula associated with the received device information and stored in the memory unit 228 (S408).

Then, when a distance measurement packet is received from the radio communication device 20' (S412), in the radio communication device 20, the communication control unit 244 controls the communication unit 216 to transmit a distance measurement packet as a response packet (S416). Further, the field intensity measurement unit 220 measures a field intensity of the received distance measurement packet (S420) and the noise floor measurement unit 224 obtains a noise floor of the received distance measurement packet (S424). Then, the field intensity and noise floor are recorded in the memory unit 228 (S428).

After that, as shown in FIG. 15, the estimation unit 232 obtains the pairs of the field intensity and noise floor stored in the memory unit 228 (S450). Next, the judgment unit 236 determines whether the noise floor value included in the respective pairs of the field intensity and noise floor is greater than the lower limit set value and smaller than the upper limit set value (S454). Then, the determination unit 236 extracts a field intensity of the pair of the noise floor, which is determined to be smaller than the upper limit set value, as data to be used by the estimation unit 232, and controls the estimation unit 232 to maintain the data as distance measurement database (S458).

Further, the estimation unit 232 determines whether the above condition A is satisfied and, when the condition A is satisfied, calculates a distance measurement evaluation value according to the distance measurement database and a previously set evaluation formula (S466). Then, when the distance measurement evaluation value is smaller than the threshold value F (S470), the estimation unit 232 estimates that the distance relation with the radio communication device 20' is a long distance (S486).

On the other hand, when the distance measurement evaluation value is greater than the threshold value F (S470) and smaller than the threshold value N (S474), the estimation unit 232 estimates that the distance relationship with the radio communication device 20' is a medium distance (S482). Further, when the distance measurement evaluation value is greater than the threshold value F (S470) and greater than threshold value N (S474), the estimation unit 232 estimates that the distance relationship with the radio communication device 20' is a short distance (S478).

[3] Radio Communication Device According to Second Embodiment

The first embodiment of the present invention has been described with reference to FIGS. 1 to 15. Next, a second embodiment of the present invention will be described with reference to FIGS. 16 to 20 after an explanation of developments to achieve the second embodiment of the present invention.

[3-1] Developments to Achieve Second Embodiment

Recently, content data such as image data and audio data have been widely transferred via various communication media such as the Internet. Especially, in recent years, regarding data transferring via the Internet, service using a stream transmission method has been increased in addition to a conventional download transmission method.

In the download transmission method, a receiving terminal firstly downloads content data (multimedia data) such as video data and audio data from a transmitter (a contents distribution server, for example) and records the data in a storage medium. After that the receiving terminal reads the content data from the storage medium to reproduce. Thus, basically in such a download transmission method, since the reproduction cannot be started before the transferring of content data is completed, the download transmission method is not effective for a long time reproduction or a real-time reproduction.

On the other hand, the later stream transmission method is a method in which a receiving terminal executes a reproduction process of content data in parallel while content data is being transferred from a transmitter. Such a stream transmission method is applied widely to Internet services that require real-time performance such as Internet telephone, remote video conference and video on demand.

In such a stream transmission method, for example, MPEG stream of image data generated by an MPEG (Moving Picture Experts Group) compression process is transferred as an IP (Internet Protocol) packet via the Internet. Such a stream transmission method is used in a system in which various communication terminals such as a PC, a PDA and a mobile phone serve as a receiver and has been developed.

Here, regarding the Internet technology that is preferable to the stream transmission method, a protocol called RTP (Real time Transport Protocol) is specified in IETF RFC (Internet Engineering Task Force Request For Comment) 1889.

In a data transfer according to RTP, a time stamp is added to a packet as time information. Then, the receiver recognizes time relationship between the transmitter and the receiver by referring to the time stamp so that synchronized reproduction can be realized regardless of influence of delay jitter of a packet transfer or the like.

Note that the RTP does not guarantee a real-time data transfer. Since the priority, settings or management of packet transfer is not covered by the transport service provided by the RTP, RTP packets may be affected by a transfer delay or packet loss on the network, similarly to other packets. However, even if such a situation occurs, the receiver can reproduce data using only packets arrived within an expected period of time.

This is because reproduction in lower data quality or reproduction by correcting data can be allowed even if there are some data loss in video data or audio data. Here, a packet which is transferred with a delay and cannot be reproduced or a packet in which an error occurs is simply deleted in the receiver. In other words, there is an issue, when a packet loss or an error occurs, the receiver cannot reproduce as maintaining the quality even if a high-quality data distribution process is being processed.

A solution for the issue in a data transferring according to the RTP can be a method for transmitting a retransmission request and a retransmission packet by TCP (Transmission Control Protocol). The TCP is effective for errors and is a reliable protocol regarding data transferring since retransmission is performed. However, the TCP is not effective for real-time communication since a retransmitted packet may be miss the time of reproduction of the packet.

Further, as an error correction method for a packet error or the like, an FEC (Forward Error Correction) has been considered for example. The FEC is a method in which an FEC packet for error correction is transmitted as a redundant packet and, when an error has occurred, the receiver recovers the lost packet due to the error according to the FEC packet.

However, the FEC has an issue that the throughput lowers since redundant packets are added. Further, it is difficult to determine an optimal additional capacity of FEC packets corresponding to the network conditions and there is an issue that an overhead of processing time has to be constantly considered.

In view of the above issue, as a possible method, there is an ARQ (Automatic Repeat Request). In the ARQ method, a receiver checks a sequence number of an RTP packet and, when a sequence number is missed, the receiver transmits a retransmission request of a packet of the missed sequence number to the transmitter. Then, since the transmitter retransmits the requested packet, a packet loss due to an error can be recovered.

As described above, the two methods (ARQ, FEC) are technologies that specify how to recover a packet loss. On the other hand, as a technology for preventing a packet loss from occurring, there is a rate control. In the rate control, for example, there is a control in which a network condition is detected from an arrived packet and, when the network is congested, the rate is controlled to reduce a possibility of a packet loss.

However, in ad-hoc communication, communication path conditions sometimes keep changing according to the distance between two radio communication devices on the transmitting side and receiving side. Thus, even when a rate control is performed merely in accordance with a network congestion, there has been an issue that it is difficult to be correspondent to changes in communication path conditions.

Thus, using the above issues as one view, it has been achieved to create a radio communication device 21 according to the second embodiment of the present invention. In the radio communication device 21 according to the second embodiment, it is possible to dynamically change the rate control according to communication path conditions. Hereinafter, the radio communication device 21 will be described with reference to FIGS. 16 to 20.

[3-2] Functions of Radio Communication Device According to Second Embodiment

Figure 16:
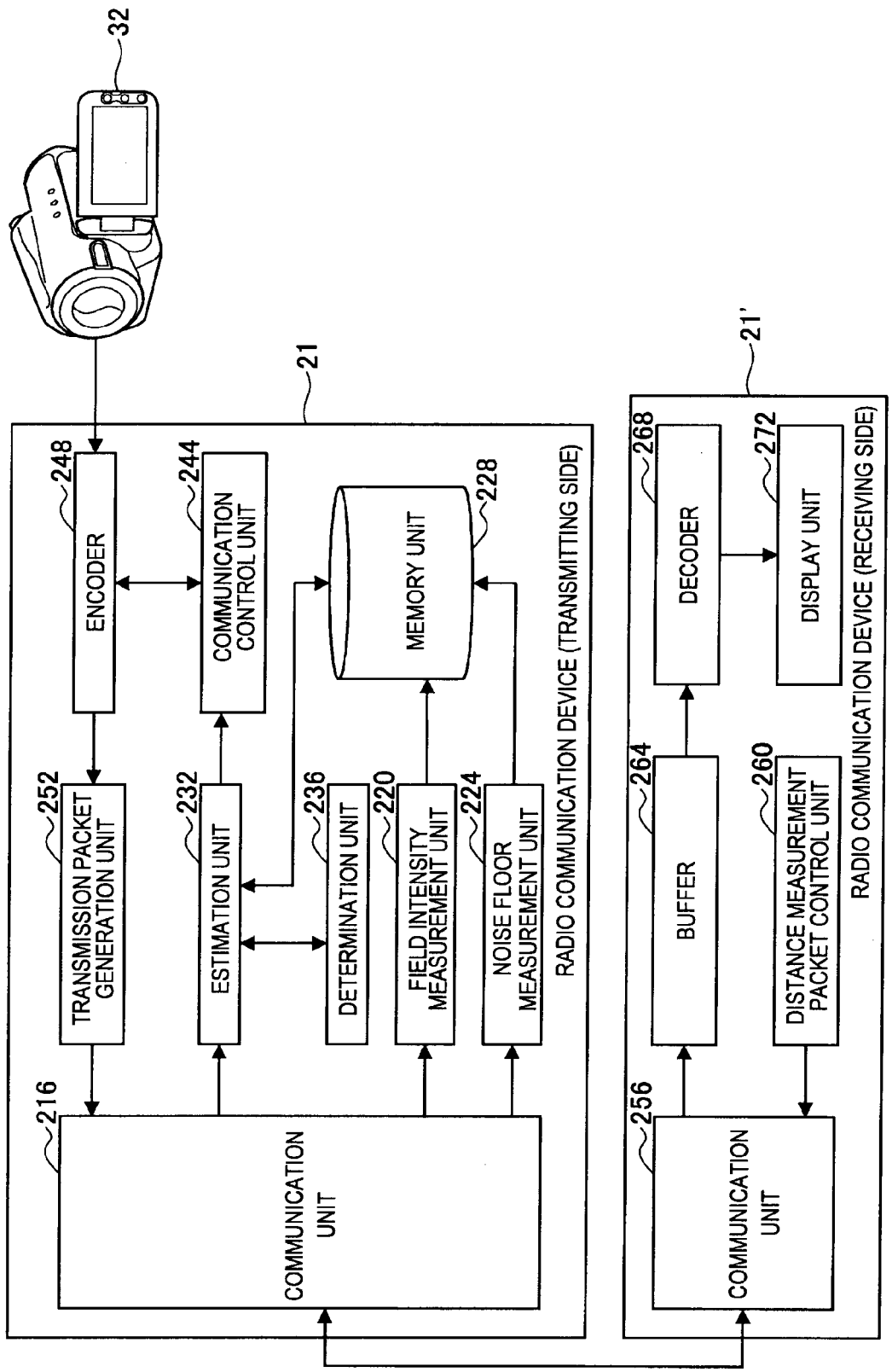
FIG. 16 is an explanatory view showing a configuration of a radio communication device according to a second embodiment of the present invention.

FIG. 16 is an explanatory view showing configurations of radio communication devices 21 and 21' according to the second embodiment of the present invention. As shown in FIG. 16, the radio communication device 21 on the transmitting side includes a communication unit 216, a field intensity measurement unit 220, a noise floor measurement unit 224, a memory unit 228, an estimation unit 232, a judgment unit 236, a communication control unit 244, an encoder 248 and a transmission packet generation unit 252. Further, the radio communication device 21' on the receiving side includes a communication unit 256, a distance measurement packet control unit 260, a buffer 264, a decoder 268 and a display unit 272. Here, since the communication unit 216, field intensity measurement unit 220, noise floor measurement unit 224, memory unit 228, estimation unit 232 and judgment unit 236 are described in "[2-2] Functions of radio communication device according to first embodiment," the following explanation will focus on the configurations different from the first embodiment.

The communication unit 256 of the radio communication device 21' on the receiving side is an interface that transmits/receives radio signals such as a distance measurement packet and streaming data to/from other radio communication devices 20' and has functions as a transmission unit and a reception unit.

The distance measurement packet control unit 260 controls transmission, from the communication unit 256 of the distance measurement packet, which is described in "[2-2] Functions radio communication device according to first embodiment." For example, the distance measurement packet control unit 260 controls so that the distance measurement packets is transmitted from the communication unit 256 periodically (every 30 ms, for example).

The buffer 264 temporarily maintains the streaming data received by the communication unit 256 as a packet from the radio communication device 21. Then, when a unit of data, which has any meaning (for example, one frame in case of a video) is maintained in the buffer 264, the data are supplied to the decoder 268. In other words, the buffer 264 functions as a depacketizer.

The decoder 268 decodes the data supplied from the buffer 264 and outputs to the display unit 272. The display unit 272 displays videos based on the data supplied from the decoder 268. For example, the display unit 272 may be a CRT (Cathode Ray Tube) display device, a liquid crystal display (LCD) device or an OLED (Organic Light Emitting Display). Here, when the data supplied from the buffer 264 is audio data, the decoder 268 may decode the audio data supplied from the buffer 264 and output to an audio output device such as an earphone, a speaker and a headphone.

The encoder 248 of the radio communication device 21 on the transmitting side has a function that captures and encodes one frame of video data taken by the imaging device 32 to supply to the transmission packet generation unit 252. More specifically, the encoder 248 encodes the video data based on the compression rate or the rate assigned by the communication control unit 244

For example, the encoder 248 compresses video data input by the imaging device 32 at 1 bps when the communication control unit 244 assigns 1 bpp (bit per pixel). Here, bpp means a value indicating how many bits should be assigned for 1 pixel. Note that bpp is only one of examples in the above explanation. Thus, the way that the communication unit 244 assigns the compression rate or the rate differs according to the way of encoding.

Here, as a data format after encoded by the encoder 248, there is an image compression format such as JPEG (Joint Photographic coding Experts Group), JPEG2000, Motion JPEG; AVC (Advanced Video Coding), MPEG (Moving Picture Experts Group) 1, MPEG2 and MPEG4, or an audio compression format such as MP3 (MPEG1 Audio Layer-3), AAC (Advanced Audio Coding), LPCM (Linear PCM), WMA9 (Windows (registered trademark) Media Audio9), ATRAC (Adaptive TRansform Acoustic Coding) and ATRAC3.

The transmission packet generation unit 252 packetizes the encoded data supplied from the encoder 248 and supplies the packet to the communication unit 216. The packetized data is converted into an electrical signal in the communication unit 216 and transmitted to the radio communication device 21' on the receiving side.

Further, the communication control unit 244 according to the present embodiment has a function as a control unit for controlling the compression rate of the video data in the encoder 248 based on the distance from the radio communication device 21' estimated by the estimation unit 232 in use of the distance estimation method described in "[2-2] Functions of radio communication device according to first embodiment."

For example, the communication control unit 244 may increase the compression rate as the longer distance from the radio communication device 21' is estimated by the estimation unit 232. Note that a longer distance between the radio communication device 21 and the radio communication device 21' results in a worse reliability of communication. On the other hand, the lower data density of the data transmitted from the radio communication device 21 results in a higher reliability of communication. Thus, as described above, the communication control unit 244 increases the compression rate as the longer distance between the radio communication device 21 and radio communication device 21' is estimated, and this can prevent a deterioration of reliability of communication.

More specifically, the communication control unit 244 may assign "1 bpp" when estimation unit 232 estimates that the distance from the radio communication device 21' is a short distance, may assign "0.5 bpp" when a medium distance is estimated, and may assign "0.1 bpp" when a long distance is estimated.

Hereinafter, an illustrative example in which the number of packet of data transmitted is varied by a control of the communication control unit 244 will be described with reference to FIG. 18.

Figure 17:
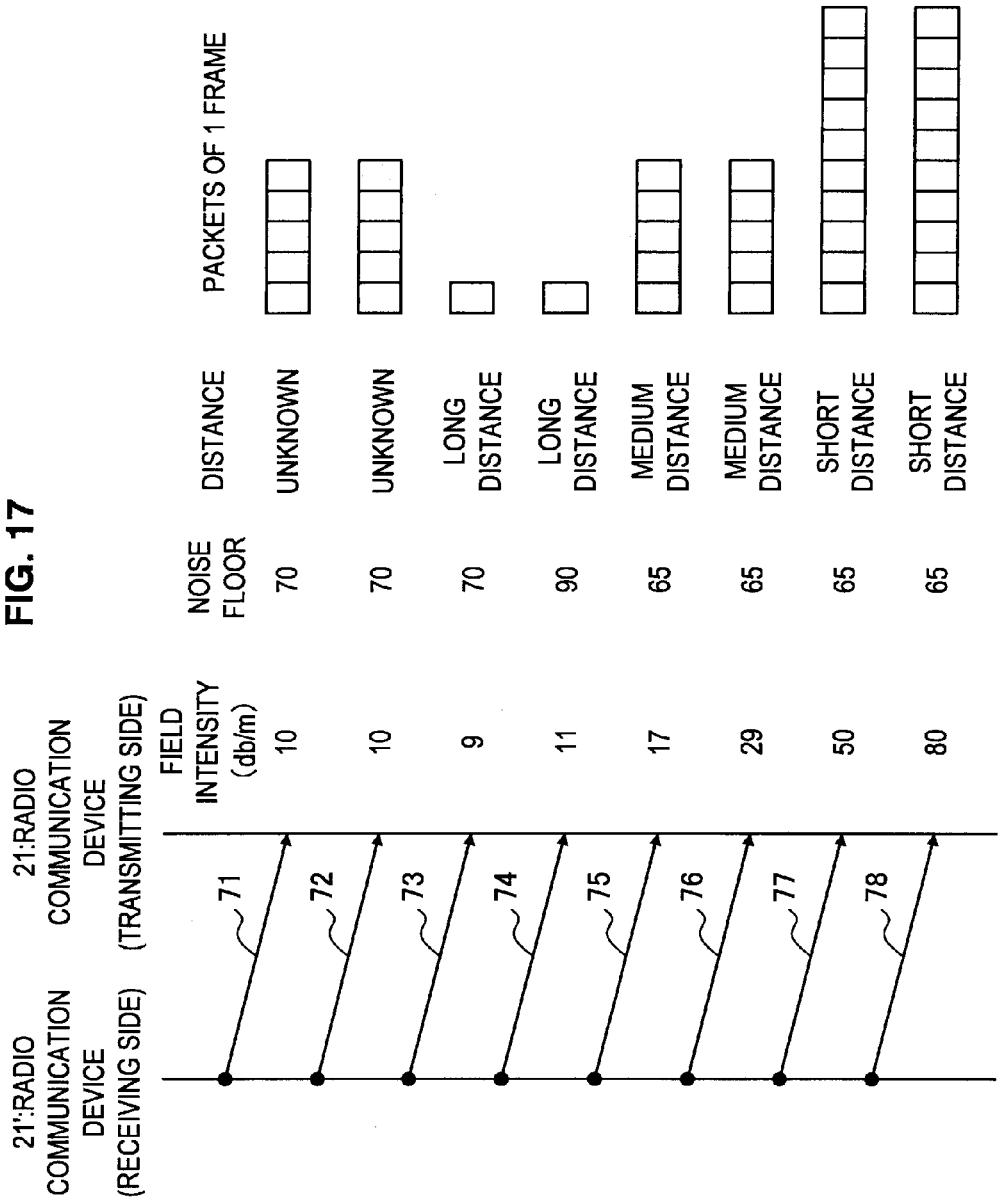
FIG. 17 is an explanatory view showing a relationship between an estimation result of an estimation unit and the number of packets of data to be transmitted.

FIG. 17 is an explanatory view showing a relationship between the estimation result of the estimation unit 232 and the number of packets of data to be transmitted. In FIG. 17, similarly to FIG. 11, the condition A is assumed that three or more pairs of the field intensity and noise floor value are accumulated in the distance measurement database and the lower limit set value used by the judgment unit 236 for filtering is set to 50 and the upper limit set value is set to 70. The estimation unit 232 calculates a distance measurement evaluation value by averaging last three field intensities and it is assumed that threshold value F=10 and threshold value N=30.

As shown in FIG. 17, the radio communication device 21 firstly receives a distance measurement packet 71. Then, the radio communication device 21 measures the field intensity of the distance measurement packet 71 as 10 db/m and measures the noise floor as 70. The noise floor of the distance measurement packet 71 satisfies the predetermined condition of the judgment unit 236, the pair of the field intensity and noise floor of the distance measurement packet 71 is maintained as the distance measurement database in the estimation unit 232. However, since the number of the pairs of the field intensity and noise floor maintained as the distance measurement database in the estimation unit 232 does not reach three, the estimation unit 232 concludes that the condition A is not satisfied and the distance from the radio communication device 21' is unknown.

As described above, when the estimation unit 232 estimates that the distance is unknown, the communication control unit 244 assigns 0.5 bpp (or 0.3 bpp may be possible) to the encoder 248, for example. Thus, the encoder 248 encodes the video data at 0.5 bpp, and the transmission packet generation unit 252 packetizes the encoded video data. The data amount of the video data packetized by the transmission packet generation unit 252 is schematically shown as 5 packets in FIG. 17.

Then, the radio communication device 21 receives a distance measurement packet 72. After that, the radio communication device 21 measures the field intensity of the distance measurement packet 72 as 10 db/m and measures the noise floor as 70. Since the noise floor of the distance measurement packet 72 satisfies the predetermined condition of the judgment unit 236, the pair of the field intensity and noise floor of the distance measurement packet 72 is maintained as the distance measurement database in the estimation unit 232. However, since the number of the pairs of the field intensity and noise floor maintained as the distance measurement database in the estimation unit 232 does not reach three, the estimation unit 232 concludes that the condition A is not satisfied and the distance from the radio communication device 21' is unknown. Thus, similarly to the case where the distance measurement packet 71 is received, the communication control unit 244 assigns 0.5 bpp to the encoder 248, the encoder 248 encodes the video data at 0.5 bpp, and the transmission packet generation unit 252 packetizes the encoded video data.

After that, the radio communication device 21 receives a distance measurement packet 73. Then, the radio communication device 21 measures the field intensity of the distance measurement packet 73 as 9 db/m and measures the noise floor as 70. Since the noise floor of the distance measurement packet 73 satisfies the predetermined condition of the judgment unit 236, the pair of the field intensity and noise floor of the distance measurement packet 73 is maintained as the distance measurement database in the estimation unit 232. Further, since the number of the pairs of the field intensity and noise floor maintained as the distance measurement database in the estimation unit 232 reaches three, the estimation unit 232 calculates a distance measurement evaluation value as (10+10+9)/3=9.666 . . . . Since the distance measurement evaluation value is smaller than the threshold value F, the estimation unit 232 estimates that the distance from the radio communication device 21' is a long distance.

As described above, when the estimation unit 232 estimates that the distance is a long distance, the communication control unit 244 assigns 0.1 bpp to the encoder 248 for example. Thus, the encoder 248 encodes the video data at 0.1 bpp, the transmission packet generation unit 252 packetizes the encoded video data. The data amount of the video data packetized by the transmission packet generation unit 252 in this manner is schematically shown as one packet in FIG. 17.

Further, the radio communication device 21 receives a distance measurement packet 74. Then, the radio communication device 21 measures the field intensity of the distance measurement packet 74 as 11 db/m and measures the noise floor as 90. Since the noise floor of the distance measurement packet 74 does not satisfy the predetermined condition of the judgment unit 236 (excesses the upper limit set value 70), the pair of the field intensity and noise floor of the distance measurement packet 74 is not used by the estimation unit 232. However, since the number of the pairs of the field intensity and noise floor maintained as the distance measurement database in the estimation unit 232 reaches three, the estimation unit 232 calculates a distance measurement evaluation value as (10+10+9)/3=9.666 . . . . Since the distance measurement evaluation value is smaller than the threshold value F, the estimation unit 232 estimates that the distance from the radio communication device 21' is a long distance. Thus, similarly to the case when the ranging packet 73 has been received, the communication control 244 assigns 0.1 bpp to the encoder 248, the encoder 248 encodes the video data at 0.1 bpp, and the transmission packet generation unit 252 packetizes the encoded video data.

Next, the radio communication device 21 receives a distance measurement packet 75. Then, the radio communication device 21 measures the field intensity of the distance measurement packet 75 as 17 db/m and measures the noise floor as 65. Since the noise floor of the distance measurement packet 75 satisfies the predetermined condition of the judgment unit 236, the pair of the field intensity and noise floor of the distance measurement packet 75 maintained as the distance measurement database in the estimation unit 232. Further, since the number of the pairs of the field intensity and noise floor maintained as the distance measurement database in the estimation unit 232 reaches three, the estimation unit 232 calculates a distance measurement evaluation value as (10+9+17)/3=12. Since the distance measurement evaluation value is greater than the threshold value F and smaller than the threshold value N, the estimation unit 232 estimates that the distance from the radio communication device 21' is a medium distance.

When the estimation unit 232 estimates that the distance is a medium distance in this manner, the communication control unit 244 assigns 0.5 bpp to the encoder 248 for example. Thus, the encoder 248 encodes the video data at 0.5 bpp and the transmission packet generation unit 252 packetizes the encoded video data. The data amount of the video data packetized by the transmission packet generation unit 252 in this manner is schematically shown as five packets in FIG. 17.

As detail explanation will be given later, when the distance measurement packets 76 to 78 are received, the estimation unit 232 operates in the same manner and can estimate that the distance from the radio communication device 21' is closer to be a short distance. When the estimation unit 232 estimates that the distance is a short distance, the communication control unit 244 assigns 1 bpp to the encoder 248 for example. Thus, the encoder 248 encodes the video data at 1 bpp, the transmission packet generation unit 252 packetizes the encoded video data. The data amount of the video data packetized by the transmission packet generation unit 252 in this manner is schematically shown as ten packets in FIG. 17.

Note that, in view of the clarity of the explanation, it has been described that the transmission timing of packetized data and the reception timing of the distance measurement packet are synchronized; however, the reception timing of the distance measurement packet and the transmission timing of packetized data by the radio communication device 21 can be asynchronous.

When the compression parameter is changed according to the distance between the radio communication device 21 and the radio communication device 21' as described above, generally robust streaming data can be supplied to the radio communication device 21' without spreading useless data to the network.

[3-3] Operation of Radio Communication Device According to Second Embodiment

The functions of the radio communication devices 21 and 21' according to the second embodiment have been described with reference to FIGS. 16 and 17. Next, an operation of the radio communication devices 21 and 21' according to the second embodiment will be described with reference to FIGS. 18 to 20.

Figure 18:
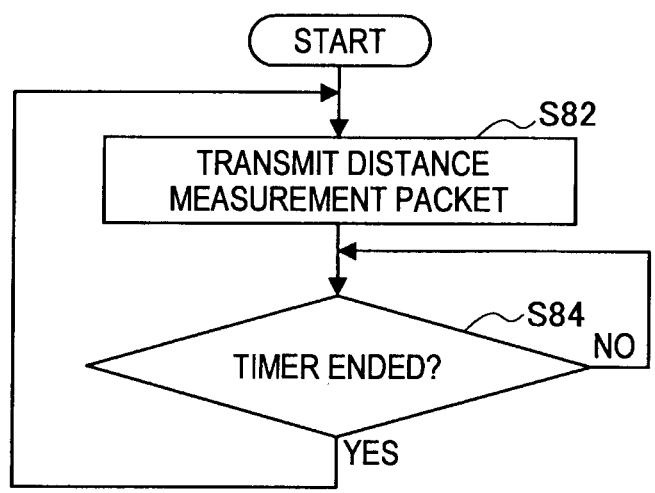
FIG. 18 is a flowchart showing a flow of a distance measurement packet transmission by a radio communication device on receiving side.

FIG. 18 is a flowchart showing a transmission of the distance measurement packet by the radio communication device 21' on the receiving side. As shown in FIG. 18, the distance measurement packet control unit 260 of the radio communication device 21' generates a distance measurement packet and controls the communication unit 256 to transmit the distance measurement packet (S82). Then, the distance measurement packet control unit 260 determines whether the count of a timer in which a predetermined initial value is set becomes 0 and the timer has ended (S84).

When it is determined that the timer has ended, the distance measurement packet control unit 260 returns to the process in step S82 to control the communication unit 256 to transmit the distance measurement packet. By such a control of the distance measurement packet control unit 260, distance measurement packets are periodically transmitted from the radio communication device 21'. Here, the distance measurement packet may be in a format according to IEEE 802.11b or may have a data amount equal to or greater than 1 byte.

Figure 19:
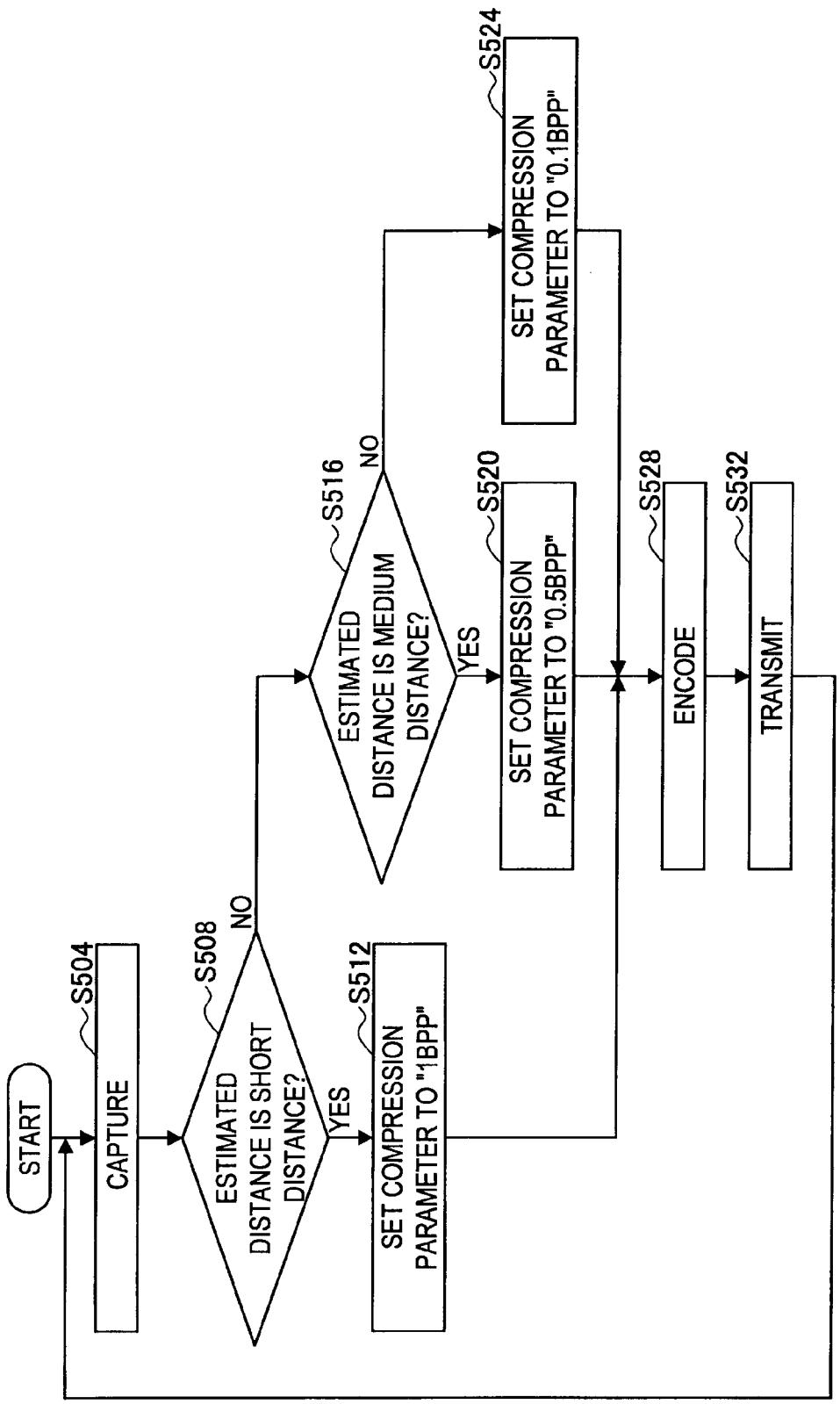
FIG. 19 is a flowchart showing an operation flow of a radio communication device on transmitting side.

FIG. 19 is a flowchart showing an operation of the radio communication device 21 on the transmitting side. As shown in FIG. 19, the encoder 248 of the radio communication device 21 captures one frame of video data from the imaging device 32 (S504). Then, when the distance from the radio communication device 21' is estimated by the estimation unit 232 (S508) and the distance is estimated as a short distance (S512), the communication control 244 assigns the compression parameter 1 bpp.

Meanwhile, when the distance from the radio communication device 21' is estimated by the estimation unit 232 as a medium distance, not a short distance (S516), the communication control unit 244 assigns the compression parameter 0.5 bpp (S520). Further, when the estimation unit 232 estimates that the distance from the radio communication device 21' is neither a short distance nor a medium distance (S516), the communication control unit 244 assigns the compression parameter 0.1 bpp (S524). Then, the encoder 248 encodes the video data captured in S504 at the compression rate assigned by the communication control unit 244, and the communication unit 216 transmits, in streaming mode, the video data packetized after being encoded (S532).

Figure 20:
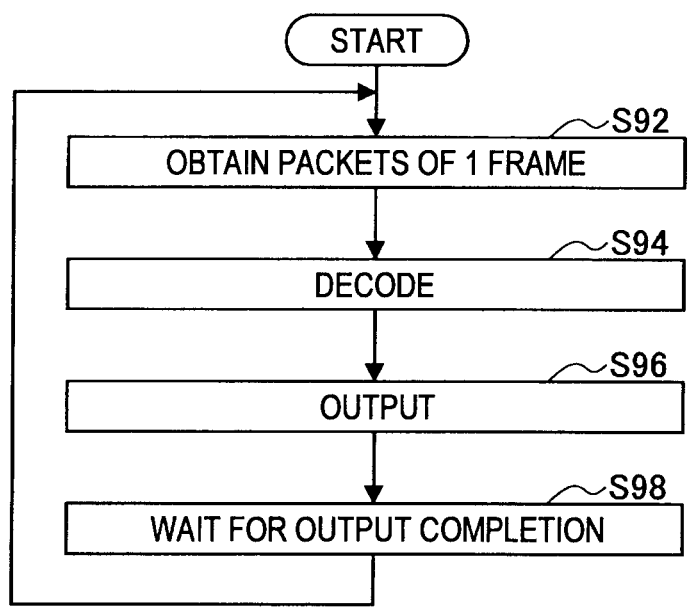
FIG. 20 is a flowchart showing a flow of decoding by the radio communication device on receiving side.

FIG. 20 is a flowchart showing a flow of decoding by the radio communication device 21' on the receiving side. As shown in FIG. 20, the decoder 268 of the radio communication device 21' obtains one frame of packets from the packets, which are received by the communication unit 256 and maintained in the buffer 264 (S92). Then, the decoder 268 decodes the obtained packet (S94), and outputs the obtained packets to the display unit 272 for example (S96). After that, when the output to the display unit 272 is finished (waiting for VSYNC), the decoder 268 returns to the process in S92.

[4] Conclusion

As described above, according to the second embodiment of the present invention, the radio communication device 21 allows the encoder 248 compresses streaming data at a compression rate in accordance with a distance from the radio communication device 21' based on a control by the communication control 244. Thus, the radio communication device 21 are capable of transmitting the streaming data after dynamically changing its compression rate according to the distance from the radio communication device 21'.

Further, according to the present embodiment, the radio communication device 20 and 21 estimates a distance from either the radio communication device 20' or 21' based on the field intensity of the distance measurement packet which has been determined to satisfy a predetermined condition regarding noise component, among the distance measurement packets received by the communication 215, by the judgment unit. That is the radio communication device 20 and 21 estimate the distance from the radio communication device 20' or 21' by using selectively the field intensity of the distance measurement packets received by the communication unit 216.

Moreover, the determination unit determines that the predetermined conditions regarding noise component are satisfied when the noise component of the distance measurement is greater than a lower limit set value and lower than an upper limit set value. Here, when the noise component of the distance measurement is below than the lower limit set value, it is assumed that the environment for receiving of the communication unit 215 is significantly worse. On the other hand, when the noise component of the distance measurement packet is greater than the upper limit set value, it is assumed that the environment for receiving of the communication unit 216 is excessively good on a temporary basis.

Thus, when the noise component of the distant measurement packet is greater than a lower limit set value and lower than an upper limit set value, it is assumed that the reception environment of the communication unit 216 is almost in a steady state. Thus, the determination unit 236 determines that the predetermined condition is satisfied when the noise component of the distant measurement packet is greater than the lower limit set value and lower than the upper limit set value as described above, so that the estimation unit 232 can estimate a distance from the radio communication device 20' or 21' based on the field intensity that is assumed to be almost in a steady state. Consequently, the radio communication device 20 and 21 can estimate the distance from the radio communication device 20' or 21' with higher accuracy.

Further, the radio communication device 20 according to the embodiment of the present invention can perform a distance estimation in accordance with a transmitting power of the radio communication device 21 in order to obtain information of the radio communication device 21, which indicates the transmitting power or the like, from the radio communication device 21 in advance.

Further, the communication control unit 244 according to the second embodiment of the present invention increases the compression rate as the longer distant is estimated by the estimation unit 232. Here, a longer distance between the radio communication device 21 and the radio communication device 21' according to the second embodiment of the preset invention results in a worse reliability of communication. On the other hand, the lower data density of the streaming data results in a higher reliability of communication. Thus, as described above, a deterioration of reliability of communication can be prevented by increasing the compression rate as the longer distance between the radio communication device 21 and radio communication device 21' is estimated.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, according to the first embodiment, an example in which the estimation unit 232 estimates the distance from the radio communication device 20' as a long distance, a medium distance or a short distance has been described; however, the present invention is not limited to this example. For example, the estimation unit 232 may estimate the distance from the radio communication device 20' by the meter (m).

Further, in the first embodiment of the present invention above, an example in which the determination unit 236 performs filtering based on noise floors has been described; however, the embodiments of the present invention are not limited to this example. For example, the determination unit 236 may perform filtering based on the size of noise component such as an S/N ratio of a distance measurement packet.

Further, the respective steps in the processes of the radio communication devices 20, 20', 21 and 21' in this specification are not needed to be processed in order described in the flowcharts. For example, the respective steps in the processes of the radio communication devices 20, 20', 21 and 21' may include processes that are executed in parallel or separately (parallel processes or process by an object, for example).

Further, it is possible to create a computer program to control the hardware such as the CPU 201, ROM 202 and RAM 203 which are installed in the radio communication devices 20, 20', 21 and 21' to perform the same functions as the respective configurations of the radio communication devices 20, 20', 21 and 21'. Further, a storage medium storing the computer program can be provided. Further, when the respective functional blocks shown in the functional block diagrams in FIGS. 3 and 16 are composed of hardware, the series of processes can be realized by the hardware.

The invention claimed is:

1. A radio communication device comprising:
a compression unit that compresses data;
a control unit that controls a compression rate of the data according to a distance between the radio communication device and another radio communication device;
a transmission unit that transmits compressed data compressed by the compression unit to the other radio communication device without relying on a radio base station;
a determination unit that determines whether a radio signal transmitted from the other radio communication device and received by a reception unit satisfies a predetermined condition regarding a noise component; and
an estimation unit that estimates the distance between the radio communication device and the other radio communication device based on a field intensity of the radio signal, which is determined to satisfy the predetermined condition regarding the noise component.

2. The radio communication device according to claim 1, wherein the control unit increases the compression rate as the distance is estimated to be more distant by the estimation unit.

3. The radio communication device according to claim 2, wherein the determination unit determines that the predetermined condition regarding the noise component is satisfied when the noise component of the radio signal is greater than a lower limit set value and lower than an upper limit set value.

4. The radio communication device according to claim 2, wherein the reception unit receives device information from the other radio communication device in advance, which indicates a transmitting power of the radio signal of the other radio communication device, and
the estimation unit estimates the distance using the device information.

5. The radio communication device according to claim 2, wherein the estimation unit
calculates an average value of field intensities of the radio signals which are determined to satisfy the predetermined condition by the determination unit,
determines in which of defined average value ranges the average value is included, and
estimates that the distance is a distance corresponding to the average value range in which the average value is included.

6. The radio communication device according to claim 1, wherein the control unit controls the compression rate so that the data is to be compressed at a rate corresponding to the distance estimated by the estimation unit.

7. The radio communication device according to claim 1, wherein the transmission unit transmits the compressed data by streaming.

8. The radio communication device according to claim 7, wherein the transmission unit transmits the compressed data to other radio communication devices.

9. A non-transitory, computer-readable storage medium storing a program, which, when executed by a radio communication device, causes the radio communication device to perform a method comprising the steps of:
controlling a compression rate of data according to a distance between the radio communication device and another radio communication device;
compressing the data at the compression rate;
determining whether a radio signal transmitted from the other radio communication device satisfies a predetermined condition regarding a noise component; and
estimating the distance between the radio communication device and the other radio communication device based on a field intensity of the radio signal, which is determined to satisfy the predetermined condition regarding the noise component.

10. A method of operating a radio communication device comprising the steps of:
controlling a compression rate of data according to a distance between the radio communication device and another radio communication device;
compressing the data at the compression rate;
transmitting the compressed data to the other radio communication device without relying on a radio base station;
determining whether a radio signal transmitted from the other radio communication device satisfies a predetermined condition regarding a noise component; and
estimating the distance between the radio communication device and the other radio communication device based on a field intensity of the radio signal, which is determined to satisfy the predetermined condition regarding the noise component.

* * * * *